US010339043B1

(12) United States Patent
Miller

(10) Patent No.: US 10,339,043 B1
(45) Date of Patent: Jul. 2, 2019

(54) SYSTEM AND METHOD TO MATCH VECTORS USING MASK AND COUNT

(71) Applicant: MoSys, Inc., San Jose, CA (US)

(72) Inventor: Michael J Miller, Saratoga, CA (US)

(73) Assignee: MoSys, Inc., San Jose, CA (US)

( * ) Notice: Subject to any disclaimer, the term of this patent is extended or adjusted under 35 U.S.C. 154(b) by 0 days.

(21) Appl. No.: 15/853,707

(22) Filed: Dec. 22, 2017

Related U.S. Application Data

(60) Provisional application No. 62/438,457, filed on Dec. 22, 2016.

(51) Int. Cl.
*H04L 12/745* (2013.01)
*G06F 12/02* (2006.01)
*H04L 29/12* (2006.01)

(52) U.S. Cl.
CPC ........ *G06F 12/0223* (2013.01); *H04L 45/748* (2013.01); *H04L 61/2007* (2013.01); *G06F 2212/154* (2013.01)

(58) Field of Classification Search
CPC ............... G06F 12/0223; H04L 45/748; H04L 61/2007
See application file for complete search history.

(56) References Cited

U.S. PATENT DOCUMENTS

| 2014/0204644 | A1* | 7/2014 | Maurya | G11C 15/00 365/49.17 |
| 2015/0341307 | A1* | 11/2015 | Page | H04L 69/22 370/392 |
| 2016/0335296 | A1* | 11/2016 | Sathe | H04L 45/74 |

* cited by examiner

*Primary Examiner* — Than Nguyen

(57) ABSTRACT

An apparatus, system, and method is described for calculating a composite index into a customizable hybrid address space that is at least partially compressed to locate a longest prefix match ("LPM") of a prefix string comprised of a plurality of multi-bit strides ("MBSs"). The device comprises: a mask-and-count logic for generating a base index into memory for a first MBS whose addresses are not compressed; a logical-shift apparatus that selectively uses a variable portion of the second MBS to generate an offset index from the given base index per an amount the second MBS addresses were actually compressed; and an add logic that adds the base index to the offset index to form the composite index that locates the LPM using a single access into memory. A compressed vector contains compression information of the second MBS in an information density format greater than a single bit to a single address.

25 Claims, 14 Drawing Sheets

| Raw Data | | Table Population Vector (TPV) (1=data) | MASK | RESULT |
|---|---|---|---|---|
| 0 | 0x1234 | 1 | 1 | 1 |
| 1 | nil | 0 | 1 | 0 |
| 2 | nil | 0 | 1 | 0 |
| 3 | 0xfeed | 1 | 1 | 1 |
| 4 | nil | 0 | 1 | 0 |
| 5 | 0x321 | 1 | 1 | 1 |
| 6 | nil | 0 | 1 | 0 |
| 7 | 0x33aa | 1 | 1 | 1 |
| 8 | 0x4444 | 1 | 1 | 1 |
| 9 | 0x4444 | 1 | 1 | 1 |
| 10 | nil | 0 | 1 | 0 |
| 11 | 0xabcd | 1 | 0 | 0 |
| 12 | 0xffff | 1 | 0 | 0 |
| 13 | 0xffff | 1 | 0 | 0 |
| 14 | 0xffff | 1 | 0 | 0 |
| 15 | 0xffff | 1 | 0 | 0 |
| * | * | * | * | * |

402

Example Count: $\Sigma$ RESULT=6

| Pop Count | Compressed Table |
|---|---|
| 0 | 0x1234 |
| 1 | 0xfeed |
| 2 | 0x321 |
| 3 | 0x33aa |
| 4 | 0x4444 |
| 5 | 0x4444 |
| 6 | 0xabcd |
| 7 | 0xffff |
| 8 | 0xffff |
| 9 | 0xffff |
| 10 | 0xffff |
| * | * |
| * | * |

| 1st MBS | COUNT of 2nd MBS | REF for COUNT | 2D CBV; N IN $2^N$ | 2D CBV; (BIN N) | REF |
|---------|------------------|----------------|---------------------|-----------------|-----|
| 000 | 8 | AA | 3 | 11 | N1 |
| 001 | 1 | BB | 0 | 00 | N2 |
| 010 | 4 | CC | 2 | 10 | N3 |
| 011 | 8 | DD | 3 | 11 | N4 |
| 100 | 1 | EE | 0 | 00 | N5 |
| 101 | 1 | FF | 0 | 00 | N6 |
| 110 | 1 | GG | 0 | 00 | N7 |
| 111 | 2 | HH | 1 | 01 | NP |

FIG. 5B

SYSTEM AND METHOD TO MATCH VECTORS USING MASK AND COUNT

CROSS-REFERENCE TO RELATED APPLICATIONS

This application claims priority to provisional application(s): Ser. No. 62/438,457 filed Dec. 22, 2016, titled "SYSTEM AND METHOD TO MATCH VECTORS USING MASK AND COUNT", the disclosures of said application is incorporated by reference herein in its entirety.

The present application is related to commonly owned U.S. patent application Ser. No. 14/872,002 to Michael Miller, Michael Morrison, and Jay Patel, titled "INTEGRATED MAIN MEMORY AND COPROCESSOR WITH LOW LATENCY,".

Furthermore, where a definition or use of a term in a reference, which is incorporated by reference herein, is inconsistent or contrary to the definition of that term provided herein, the definition of that term provided herein applies and the definition of that term in the reference does not apply.

FIELD OF TECHNOLOGY

This disclosure relates generally to the technical fields of vector matching, and in one example embodiment, this disclosure relates to a method, apparatus and system of vector matching for a network address.

BACKGROUND

Vector, or data string, matching has many applications in algorithms, database management, data mining, and other operations requiring matching of a string of data. More specifically, a very common application of string matching is a data network, which seeks matching addresses for forwarding operations in a network, such as a local area network (LAN) or the Internet. Data communication networks utilize addresses to forward packets of information between users. As data communication networks continue to evolve, the length of addresses supported, the quantity of traffic, and the data rate with which the traffic is traveling are all increasing. Consequently, routers in such communications networks must determine sources and destinations of endstations associated with traffic more quickly than in the past. For example, Internet Protocol version 4 ("IPv4"), which uses 32-bit addresses and is still in use today, has evolved to the more recent IPv6, which uses 128-bit addresses. Explained differently, IPv6 has about $7.9 \times 10^{28}$ times more addresses as IPv4. With an increase in the quantity of addresses, a commensurate increase in the size of memory is needed to hold all those addresses. Furthermore, if throughput rates are to be maintained, address lookups in the vastly larger memory block may take longer.

Routing data packets in Internet Protocol (IP) networks requires a determination of the best matching prefix corresponding to the source and destination addresses for the packet. This process is also referred to as determining a longest prefix match (LPM) for an address. Routers that forward packets typically include a database that stores a number of address prefixes and their associated forwarding decisions (a next address) that indicate where the data should be sent next (next hop). When the router receives a packet it must determine which of the addresses in the database is the best match for the packet based on the longest prefix match (which corresponds to the longest string of digits from the left side of the number moving towards the right side, which represent a more specific address location).

Parsing a long 32-bit or 128-bit address into multiple strides having multiple bits in each stride allows an address to be searched in chunks. The smaller the strides, the more discrete the mapping of the addresses is for a given stride. For example, if searching in 4-bit strides, a very small block of memory is used to store the $2^4=16$ memory locations for a 4-bit stride. If some of the memory blocks have no associated data (i.e., a forwarding address), then the memory block is bypassed, and can be repurposed to conserve memory bandwidth. However, the tradeoff for saving memory using this procedure is the high latency needed for the thirty-two sequential instances of 4-bit strides for spanning a 128-bit address. Parsing into longer bit strides reduces the quantity of sequential strides, but does not allow for tailoring the memory to take advantage of missing or duplicative entries.

Search instructions and algorithms can be used in a linear and unidirectional way, such as searching for increasing lengths of matching strings searching a LPM. Referring to FIG. 1A, a basic binary trie 10 (pronounced 'try') is illustrated for conducting a search with successively matching bits in a bit string, or vector. For example, bit string, or address, '0001' for node C has no data, while bit string '1101' for node D does have data. To determine this result for '0001', for example, a search would start at the top of the diagram, move left three successive times for the first three bits '000', and then move right to arrive at the location of '0001', which in this case does not have an associated data. Consequently, a LPM would be '00', which has a darkened circle representing, for a network routing application, a forwarding address. Referring to FIG. 1B, a Patricia trie 11 is shown, which compacts a search by moving a data point upward if there is no decision to be made. For example, data at node A is moved up to node B, because C has no associated data, thereby making distinguishing of bits after node B irrelevant.

Search instructions and algorithms can also be used in a circular or multi-directional manner. For example, FIG. 1B illustrates a cycle graph 12 that can have a path that is linear and open, i.e. A-C-E, a closed path with a repeated vertexes, i.e., B-F-C-E-F-D-B, and a cycle with no repeated edge or vertexes, i.e., B-F-D-B. The specific choice depends on an application, and what addresses are used as the next hot address. Regardless of the application, be it in a linear Patricia trie, or a cycle graph, both can benefit from improvements in data matching.

If prior attempted solutions scaled into multiple arrays having a fixed length, then that is mathematically determinate. However, that is not helpful when the depths of nested arrays have a variable length.

SUMMARY

An apparatus, system, and method for calculating a composite index into a compressed address space based on a longest prefix match ("LPM") of an prefix string, aka a LPM vector ("LPMV") or data string ("DS"), is described.

Specifically, the device comprises logic for generating a composite index into a compressed address space of a memory (i.e., main memory) to locate a longest prefix match (LPM) of a prefix string. The prefix string is comprised of a plurality of (concatenated) multi-bit strides ("MBSs"), e.g., a first MBS and a second MBS, of variable length, per the choice of the designer, that are stored, e.g., in a register. The composite index into memory allows as few as a single access into the memory to retrieve data, i.e. the LPM (and its associated data), that matches the plurality of multi-bit strides of the LPMV the closest. At least one of the multi-bit strides is mapped to a compressed address space in the memory.

A local memory stores a compressed bit vector ("CBV"), or an encoded or a modified population count (popcount) vector (PCV). The CBV contains a plurality of compressed popcounts, each of the popcounts associated with a compression of addresses for a given second MBS of the prefix string. In one embodiment, an encoded population count represents a power of 2. As an example, if a given second MBS of the prefix data is designed with a width of three bits, then the maximum quantity of addresses is eight [0-7], namely 000 . . . 111. Thus, the compressed popcount, x, using an encoding of a power of $2^x$, would equal 8 entries is x=3, or '11' in binary which dictates a two-bit width for the CBV. Alternatively, the two-bit width of the CBV can have a value of 00, which indicates only one entry and a stride of zero. Using this compressed popcount has the benefit of using fewer bits to store the binary value (two digits of '11' for 3, instead of four digits of '1000' for 8) and of indicating how many binary address digits are needed to represent the popcount (useful in generating the offset index). Thus, the CBV is indicative of the variable depth of the compressed address space for the second stride of a given first MBS. The compression vector is at least two bits wide to accommodate 'x' (of $2^x$) for the maximum amount of entries for a given bit-length second MBS (e.g., for a second MBS width of four bits, a maximum quantity of entries is sixteen [0-15], namely 0000 . . . 1111; so the compressed popcount, x, for the power of $2^x$ that would equal 16 entries is x=4, or '100' in binary which needs only a three-bit width). A host processor (e.g., a network processor unit, NPU of a router) uses mask and count (popcount) of addresses for the second MBS in linear address space of its memory to discount nulls and duplicates and thereby to generate a CBV for a compressed address space (without nulls and duplicates). Both the CBV and the compressed address space are used in a memory of a dedicated LPM co-processor coupled to the host processor.

The logic of the dedicated LPM co-processor that uses the CBV and compressed address space to generate a composite index includes: a first logic portion that generates a base index for the first MBS; a second logic portion coupled to the first logic portion, for generating an offset index from the base index per the second MBS; and a third logic portion that combines the base index for the first MBS and the offset index of the second MBS into a composite index for making a single access into the memory to locate the LPM. The logic calculates the composite index prior to a first access to the memory, and thus does not require time-consuming repeated accesses into memory for the given prefix string.

The first logic portion that generates a base index for the first MBS includes a mask-and-count logic (612) coupled to the register to receive a given first MBS (602-1) of the unique data string. The mask function is accommodated by a multiplexer, which uses the first MBS as a selector to select the relevant portions of the CBV associated with the given first MBS. Thus, the mask-and-count logic masks at least a portion of the plurality of population counts of the CBV stored in local memory that are not associated with the given first MBS (602-1). Additionally, the mask-and-count logic counts another portion of the plurality of population counts from the local memory that is associated with the first MBS to generate a base index (BASE A thru J) into the main memory. Notably, the mask-and-count logic includes a function that scales the CBV value by using it as a power of two to bring it back into a count value. Thus, a fully populated field for a second MBS of 3b would have eight entries, thereby squaring the CBV binary value of '11' for two (or base 10 values of $2^3$=8) to indicate a total count of entries as being eight. The count function is implemented by one or more adders (630-1 to 630-N) coupled to the local memory to receive one or more of the plurality of modified population counts of the CBV associated with the given first MBS (602-1) of the unique data string. The net output from the mask and count logic is a base index (M-Base) (1-Base to P-Base FIGS. 5-6) portion of the composite index.

The second logic portion coupled to the first logic portion, is for generating an offset index from the base index of the given first MBS per the given second MBS portion of the prefix string. The second logic portion includes a variable shifter (614+616) coupled to receive the second MBS from the register (602-2). The variable shifter selects a variable number of bits of the given second MBS of the unique data string based on one or more of the plurality of population counts (X1, X2, . . . or XP) associated with the given second MBS. The variable shifter performs a quantity of shifts that is (qualitatively) inversely proportional to a quantity of the given population count. The variable shift register then outputs an offset index measured from a base index, together which form the composite index into main memory to locate the LPM.

The variable shifter is implemented as an inverter coupled to a variable shift register. The inverter (614) is coupled to the local memory to receive and invert a given encoded population count from the CBV that is associated with the second MBS of the unique data string (the modified popcount is not squared to a count value like the popcount for the base index). The variable shift register (616) receives the inverted modified population count and variably shifts the given second MBS of the unique data string by the inverted given population count so as to selectively discard a portion of the second MBS of the unique data string. Thus, the variable shifter can shift the address bits of the given second MBS (e.g., 3b width) i) a maximum of three bits (thereby using no bits from the given second MBS) which results in a offset index of '0; to ii) a minimum of zero bits (thereby using all bits from the given second MBS) which results in a offset index according to the given address of the given second MBS.

For example, if a second MBS associated with a first MBS has only one unique entry (the rest null or duplicates), the second MBS address is '000' for a 3b wide MBS. This equates to a base index into the main memory for the first MBS portion of the prefix string (e.g., '101') plus an offset index of zero therefrom for the sole entry of the second MBS ('000'), with the LPM resultantly being located at the base index. If there are no values for the given second MBS in memory (default address '000'), then only the first MBS address exists (e.g., '101'). In this case, no bits of the second MBS are necessary to index further down into the main memory. Consequently, the modified popcount for the given second MBS is '00' for the 2b CBV field, which inverted is binary '11', or three (not squared to a count value like the popcount for the base index), to shift the 3b entry for the second MBS over 'three' (thus ignoring its value and resulting in an offset index of '0'). In one embodiment, the prefix string is a 12-bit total stride comprising a first stride of 4 or 5 bits and a second stride of 8 or 7 bits, respectively. The first logic portion and the second logic portion are coupled in parallel to the first MBS and the second MBS, and to an adder that combines the base index from the first logic portion with the offset index from the second MBS to form a composite index.

The apparatus can be implemented in hardware logic in one embodiment, or can be implemented by an instruction to a processor to execute the equivalent functions of logic. With a programmable instruction, greater flexibility in stride sizes and vector sizes can be obtained. Overall, the present disclosure presents a hybrid parallel processing of the multiple strides, each being multiple bits in length, and with at least one having a variable length stride. The hybrid approach involves the use of a multi-bit population count vector for a first multi-bit stride to establish a base point from which an index from the second multi-bit stride can progress. The second multi-bit stride is variable in that the bits therein are shifted to utilize only the unique bits populated in the compressed memory space.

The methods, operations, processes, systems, and apparatuses disclosed herein may be implemented in any means for achieving various aspects, and may be executed in a form of a machine-readable medium, and/or a machine accessible medium, embodying a set of instructions that, when executed by a machine or a data processing system (e.g., a computer system), in one or more different sequences, cause the machine to perform any of the operations disclosed herein. Other features will be apparent from the accompanying drawings and from the detailed description that follows. Accordingly, the specification and drawings are to be regarded in an illustrative rather than a restrictive sense.

In context, a linear address map of all combinations of a given address scheme, e.g., IPv4, would be excessively large. Compressing a population of addresses to eliminate null values and duplicate values substantially reduces the memory needed to store and search for a match. However, the non-linear nature of the compressed sequence makes a pure sequential search difficult.

BRIEF DESCRIPTION OF THE VIEW OF DRAWINGS

Example embodiments are illustrated by way of example and not limitation in the figures of the accompanying drawings, in which like references indicate similar elements and in which:

FIG. 4 is a an illustration of a raw data table, a table population vector, a mask and a resultant population count, and compressed table, according to one or more embodiments.

FIG. 5B is a table illustrating a population count of a second MBS associated with each of multiple first MBS addresses, according to one or more embodiments.

Other features of the present embodiments will be apparent from the accompanying drawings and from the detailed description that follows.

DETAILED DESCRIPTION

A method, apparatus and system for calculating an index into a compressed address space based on a longest prefix match ("LPM") of a prefix string, aka an LPM vector ("LPMV") or data string, is disclosed. In the following description, for the purposes of explanation, numerous specific details are set forth in order to provide a thorough understanding of the various embodiments. It will be evident, however to one skilled in the art that various embodiments may be practiced without these specific details.

Architecture

Figure 1A:
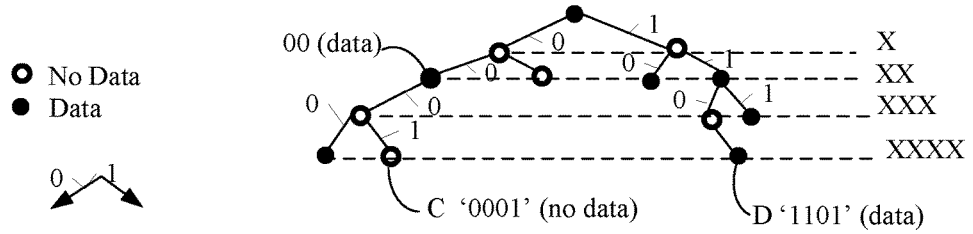
FIG. 1A is a diagram of a binary trie structure.
Figure 1B:
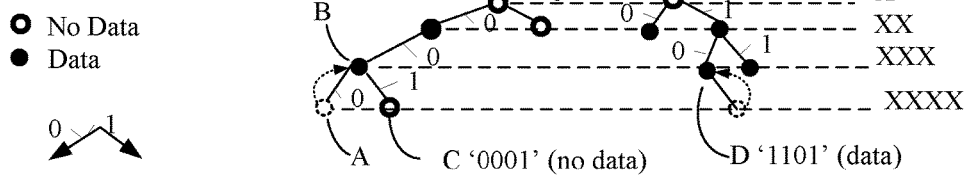
FIG. 1B is diagram of a Patricia trie structure.
Figure 1C:
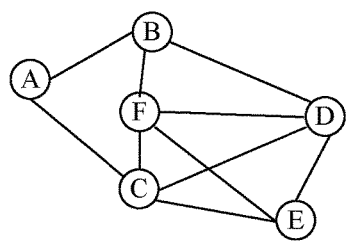
FIG. 1C is a diagram of a cycle graph structure.
Figure 2:
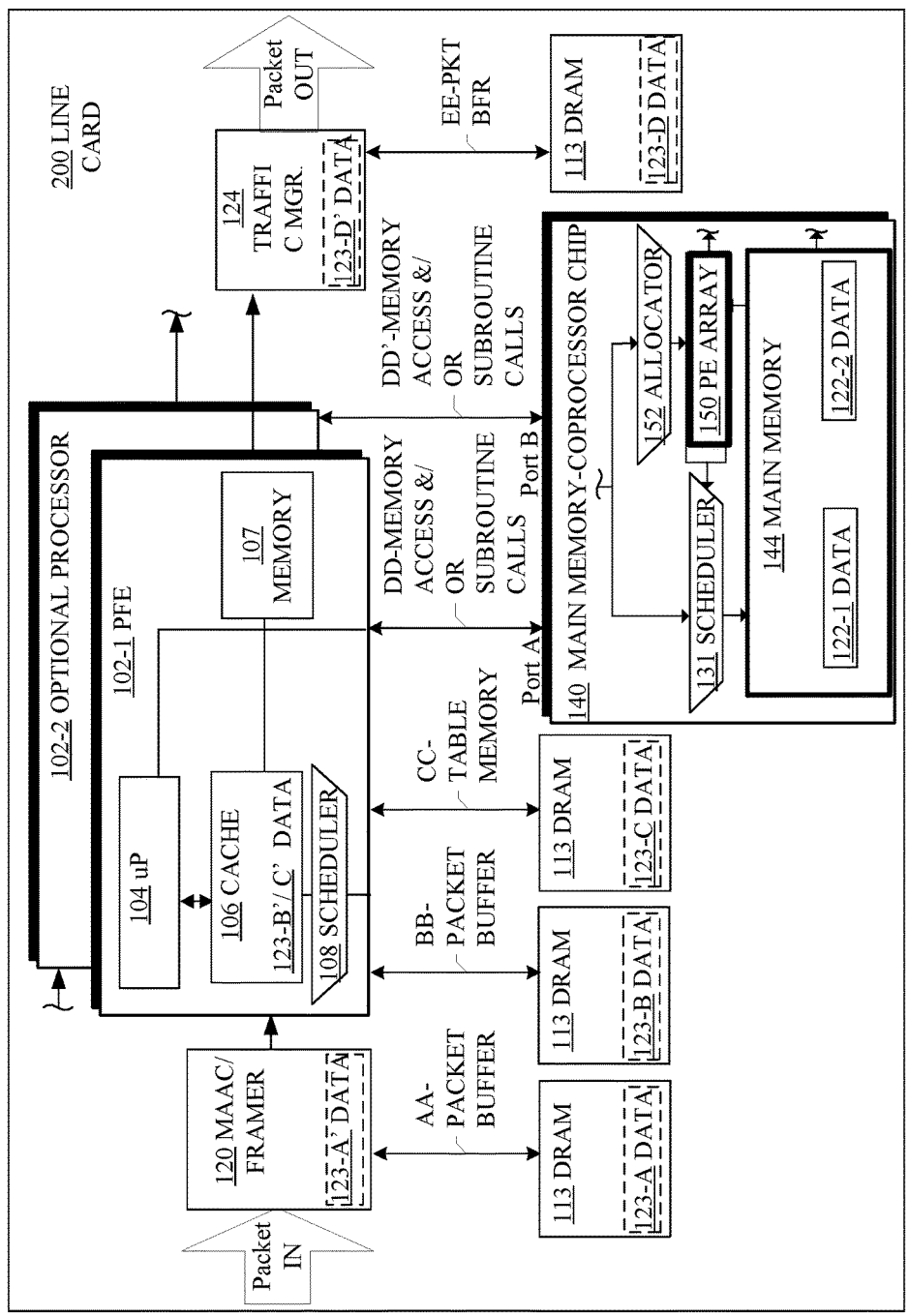
FIG. 2 is a block diagram of a network line card with a coprocessor chip for performing vector searches, according to one or more embodiments.

Referring now to FIG. 2, a block diagram is shown of a network line card 200 with a coprocessor chip 140 for performing vector or LPM searches, according to one or more embodiments. In one embodiment, an incoming data packet having a source address and a destination address is seeking an address for a next hop address (router) en route to its destination. Using the embodiments herein, a short or lengthy prefix string (e.g., 3, 6, 8, 11 bits or longer) can be processed with as few as one instruction cycle thereby providing a single composite index output for accessing main memory. Additionally, an LPM for a lengthy prefix string can be generated with low latency, because only a single access into main memory is required. Finally, the main memory is space-efficient because the address space is at least partially compressed. Resultantly, the logic in the processing engine (PE) array 150 and a routing table located in space-efficient main memory 144 provides the desired LPM data for the long prefix string. Thus, the present disclosure overcomes high latency, bulky instruction code, and/or inefficient memory blocks used by other attempted solutions that require multiple instruction cycles, multiple accesses into memory, and/or large memory blocks to store uncompressed linear address space. Specific details of the present disclosure are provided in FIGS. 6 and 7A through FIG. 7C for the logic apparatus and in FIGS. 8A and 8B for the methodology. In addition, one embodiment of a PE array 150 is shown as a PE cluster (PEC) in subsequent FIG. 3.

The line card 200 includes a packet forwarding engine (PFE) 102-1 and an optional processor 102-2 coupled in parallel to manage different portions of the network traffic. Optional processor 102-2 can be a network processing unit, a special function processor, or a co-processor. The PFE 102-1 and optional processor 102-2 process network packets, e.g., Internet packets, for routing, security, and other management functions. This task consumes a substantial amount of processing bandwidth to accommodate high traffic rates of packets. The PFE 102-1 and optional processor 102-2 can be a field programmable gate array (FPGA), an application specific integrated circuit (ASIC), or an application specific standard product (ASSP), etc., that operates on all types of private and public networks, such as a LAN, WAN, SAN, VPN, etc., within a company and out to the public Internet.

The PFE 102-1 includes a microprocessor (uP) 104 coupled to a memory cache block 106 of random access memory (RAM), for storing instructions or data temporarily on the die of the PFE 102-1 for quicker access than off-chip memory storage, i.e. DRAM 113. Scheduler 108 manages access calls to DRAM 113 to avoid a conflict, while accessing DRAM 113, e.g., simultaneously accessing a same memory bank, per rules established by the DRAM designer. The scheduler 108 adds latency to the packet processing functions of PFE 102-1 by requiring PFE 102-1 to generate access fetches to off-chip memory, including the resolution of conflicts therein.

The media access controller (MAAC) and framer 120, process network packets coming into the line card 200 to ensure proper packaging of control and data portions of the packet. The PFE 102-1 and optional processor 102-2 then perform the network management functions on the network packet, followed by a traffic manager (TM) block 124, which regulates the output of packets from the line card to match the network capabilities.

Commodity DRAM 113 is utilized liberally in the line card 200 for packet buffering purposes. For example, when different blocks in the pipeline reach their capacity and stop accepting packets from an upstream block, upstream packets are frequently buffered by off-chip DRAM 113. Moving data back and forth from DRAM 113 is illustrated as paths AA, BB, CC, and EE. Data is moved from dashed memory locations 123-A, -B, -C, and -D in DRAM 113 to memory locations 123-A', B'/C', and D' (prime) in the functional block, MAC/framer 120, PFE 120-1, and TM 124, respectively. A substantial amount of power is consumed moving data back and forth from DRAM. Consequently, any reduction in caching or buffering will help reduce power demand for the line card.

One DRAM 113 is slated for storing control data 123-C in a table format to be communicated back and forth to PFE 102-1 via link CC, to store cache versions of this control data, shown as dashed block 123-C' (prime), in cache memory block 106 of PFE 102-1. While the DRAM 113 storage of table data 123-C is more sophisticated than that of the balance of the DRAMs 113 that simply buffer packets, having to move any data back and forth between DRAM 113 and PFE 102-1 still potentially adds latency to the pipeline. Specifically, the latency arises by requiring PFE 102-1 to schedule access calls, by requiring DRAM 113 to read the data 123-C, by requiring cache 106 to store data 123-C', and by requiring uP 104 and/or scheduler 108 to resolve any conflicts in the memory fetch from DRAM 113 and to resolve any coherency issues between the two versions of data 123-C and 123-C'.

The main memory/coprocessor (MMCC) chip 140, a monolithic device, includes a scheduler 131 coupled to a processor engine (PE) array 150, also referred to as a PE complex, and to a large block of main memory 144. PE array 150 provides processing resources to perform a set of C subroutine (CSUB) code and functions on data 122-1 and 122-2 stored in MM 144. By performing the set of subroutines and functions locally on data stored in its main memory 144, the MMCC 140 will: i) eliminate transit time and reduce power consumption otherwise required to send the data back to the processors 102-1, and 102-2; and ii) increase uP 104 bandwidth for other networking tasks by not requiring it to perform subroutines that the PE array 150 can perform.

Data blocks 122-1 and 122-2 in MMCC 140 are not dashed in the illustration because they are data solely stored in MM 144 as the master version of a given type or range of data. In comparison, DRAM 113 stores data temporarily, which is illustrated as dashed blocks of data 123-A, -B, -C, and D. While PFE 102-1 and optional processor 102-2 can access data in MM 144 for specific purposes, they do not access large chunks of data transfer back and forth between themselves and MM 144, except for populating MM 144 at initialization of MMCC 140 or line card 200. Thus, MMCC 140 eliminates power otherwise required for transferring large blocks of data back and forth to processor(s) 102-1 and 102-2. Additionally, MMCC 140 eliminates coherency problems that would otherwise arise from having multiple versions of data disposed on separate chips.

Additionally, the two exemplary instances of data 122-1 and 122-2 on a single MMCC chip 140 can be managed by MMCC 140 for two separate users, i.e., processors, 102-1 and 102-2, respectively. This sharing of resources, from both MM 144 and PE array 150 resources on MMCC 140 to multiple processors 102-1 and 102-2, is performed seamlessly and transparently without requiring the multiple processors 102-1 and 102-2 to coordinate between themselves to avoid conflicts while accessing said shared resources. This is accomplished by slaving the MMCC 140 to the two processors via different ports. Namely, MMCC 140 is slated to PFE 102-1 via port A with I/O serial lanes DD and is slated to optional processor 102-2 via port B with I/O serial lanes DD'. The task of tracking commands and data from the multiple processors 102-1, and 102-2, is performed by MMCC 140 via tagging the data and commands with a scheduling domain thread, as described in subsequent figures and flowcharts.

As an example, PFE 102-1 can issue a string of access commands to MM 144, including optional memory partition location of data, without having to spend uP 104 bandwidth resolving any possible bank conflicts in MM 144. Additionally, PFE 102-1 can interleave the string of access commands with a plurality of network-related subroutine calls to PE array 150, such as a longest prefix match (LPM) on an IP addresses. In parallel with these commands from PFE 102-1 to MMCC 140, the optional processor 102-2 can also be communicating access commands and subroutine commands to MM 144 and PE array 150 of MMCC 140, without coordinating those commands with the first processor PFE 102-1. Thus, MMCC 140 provides an efficient solution to reducing the high processing demands on the PFE 102-1, while reducing latency of the pipelined processing of data packets on line card 200, and reducing power and latency otherwise required by transferring data back and forth to the cache 106 of PFE 102-1.

While the quantity of ports on MMCC 140 in the present embodiment is two (ports A and B), any quantity of ports can be used, with the quantity of ports equal to the quantity of external processors that MMCC 140 can support independently. Thus, a two port MMCC 140 with eight total significant digits (SDs) can independently support two external processors evenly with four SDs per external processor or port. The quantity of SDs can be scaled to any quantity of ports for a different MMCC design. For example, an MMCC with four ports, not shown, and 12 scheduling domains could be linked to four separate external processor chips, with three scheduling domains per external processor.

More detail on the line card application is disclosed in U.S. patent application Ser. No. 14/872,137, filed Sep. 30, 2015, titled "INTEGRATED MAIN MEMORY AND COPROCESSOR WITH LOW LATENCY", which is commonly assigned with the present application and which is hereby incorporated by reference in their entirety. This and all other referenced patents and applications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

Figure 3:
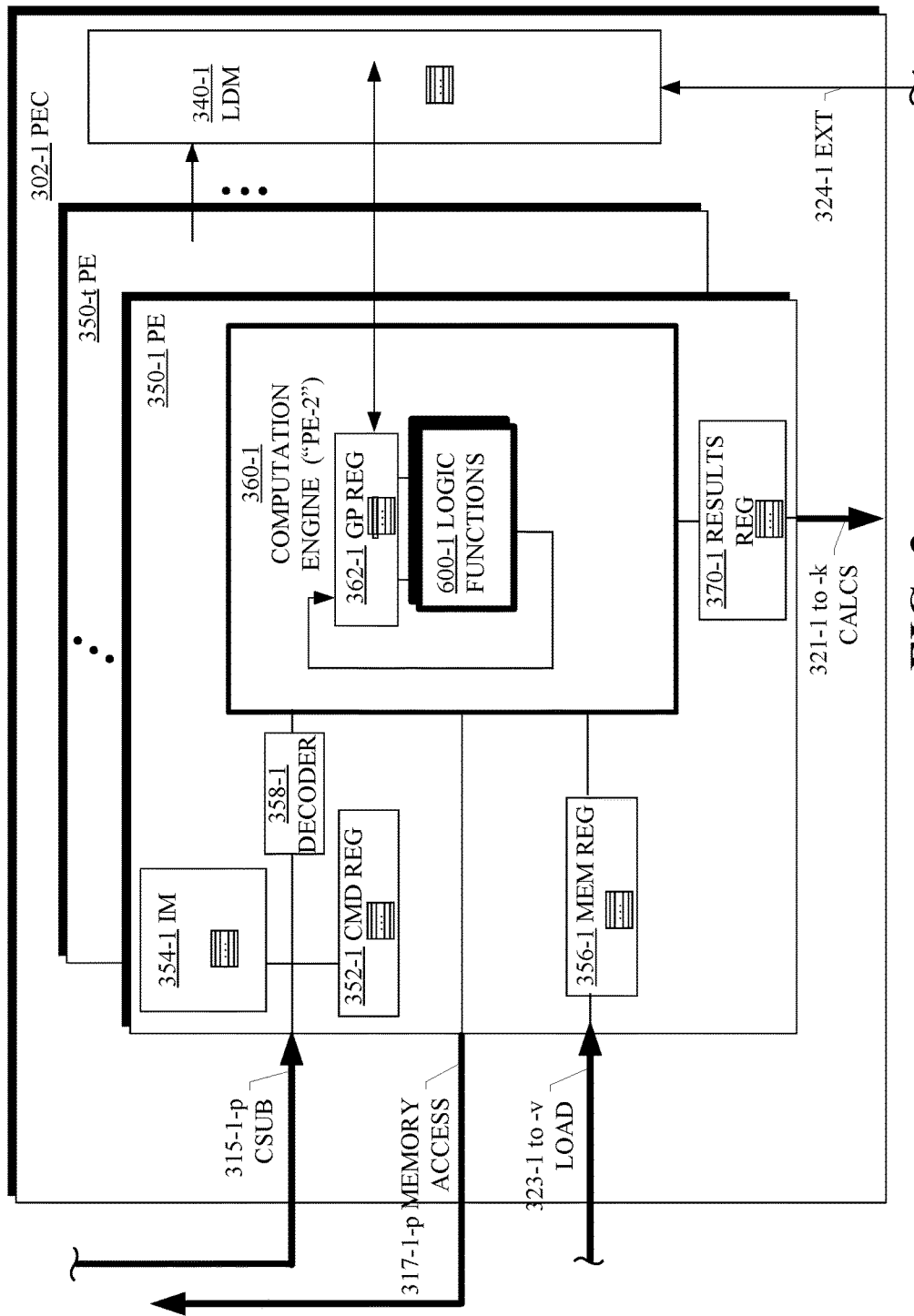
FIG. 3 is a schematic of a microprocessor and memory for executing instructions to perform vector searches, according to one or more embodiments.

Referring now to FIG. 3, a schematic is shown of a microprocessor and memory for executing instructions to perform vector searches and/or LPM matches, according to one or more embodiments. Specific details of the present disclosure are provided in FIGS. 6 and 7A through 7C for the logic apparatus and in FIGS. 8A and 8B for the methodology. Specifically, one embodiment of logic functions block 600-1 in FIG. 3 is provided as index-generating logic schematic 600-1A of FIG. 6.

While a general-purpose processor and memory can implement the present disclosure, the present embodiment utilizes an individual programmable engine (PE) 350-1. The heart of PE 350-1 is the computation engine 360-1, comprised of logic functions 600-1, which are described in a subsequent figure, coupled to a general-purpose register (GP REG) 362-1. Logic functions 600-1 comply with a classic five-stage reduced instruction set computer (RISC) protocol that executes one instruction per cycle. However, computation engine 360-1 is not a general purpose CPU (GPCPU) because it does not have an operating system (OS), and does not support an 'interrupt' or a 'cache-control instruction. Once an instruction is started on the PE, it runs until completion.

The PE cluster (PEC) 302-1 is comprised of a plurality of PEs 350-1 to 350-t coupled to each other and to shared local data memory (LDM) 340-1 that provides faster access of urgent or frequently used data compared to MM 144. PEC 302-1 offers fastest access because of its closer proximity to the PEs 350-1 to 550-t, and because it is an SRAM memory type, which is faster than the eDRAM memory type of MM 144. The LDM 340-1 is also accessible externally from PEC 302-1 by line 324-1, to other PEs in other PECs (not shown), though the extra distance and logic required for an access external to its given PEC 302-1 results in slightly longer access time. By disposing memory locally, reduced latencies are accomplished. By sharing the local data memory 340-1 resource via intra-PEC or inter-PEC, memory resources can be effectively shared to accommodate an intermittently high memory demand in a given PE.

The CSUB CMD is communicated to the PE 350-1 via one or more lines 315-1 through 215-$p$. The CSUB CMD points to a starting line of the given CSUB code in instruction memory (IM) 554-1 or in CMD registers (CMD REG) 352-1, which is subsequently decoded by decoder 358-1 and processed by computation engine 560-1. As indicated by the partitions icon, IM 354-1 and CMD REG 352-1, these resources are partitioned to a quantity of processing threads instantiated by a user of the PE array 350. That is, the multi-threaded processing threads of the CP are configurable, heterogeneously through the array. Thus, one or more of the PEs could be configured to operate concurrently with different quantity of threads. For example, a quantity of PEs could be configured with different threading as follows (quantity PEs/number of threads: 1/8, 5/7, 4/6, 1/5, 19/4, 1/1, 1/0 (not used). This offers a user a wide variation in performance adaptation to given application. Furthermore, these differently configured PEs could be assigned different types of classes of CSUB CMDs. Thus, short CSUBS could be assigned to run on PEs configured with eight threads because short CSUBs will finish quicker. Moreover, longer CSUB code can be assigned to PEs configured with only one or two threads, because they need more bandwidth to complete the SUB. Thus, the bandwidth of the resource is divided equally among the quantity of partitions selected, from one to eight in the present embodiment, as determined by the user and as implemented during initialization of MMCC 140. Memory register 356-1 is similarly partitioned per processing thread to hold data values fetched by computation engine 360-1 via line 317-1 to 31'7-$p$ from MM 144 and returned from MM 144 on lines 323-1 through 323-$v$. Output results from computation engine 560-1 are stored in results register (REG) 370-1 per the processing thread partition therein, and finally output on lines 321-1 through 321-$k$.

More detail on the microprocessor application is disclosed in U.S. patent application Ser. No. 14/872,137, filed Sep. 30, 2015, and titled: "INTEGRATED MAIN MEMORY AND COPROCESSOR WITH LOW LATENCY", previously incorporated by reference.

Referring now to FIG. 4, an illustration is shown of a raw data table, a table population vector, a mask and a resultant population count, and compressed table, according to one or more embodiments. Table 402 shows row counts (0, 1, 2, 3 . . . ) and associated raw data (0x1234, nil, nil, 0xfeed . . . ), respectively. Table population vector (TPV) column lists a '1' for valid data and a '0' for invalid or 'nil' data. By selectively applying a mask of '0' to block, and '1' to read, a resultant column of 'Results' is obtained, which represents an 'AND' operation of the TPV and the mask columns. A compressed table 404 is formed by omitting the rows having 'nil' and by using the population count result for a given valid data to indicate its index into the compressed table. These concepts are useful in the subsequent figures that use these concepts for building a compressed bit vector to generate a composite index into memory for a single access to a LPM of a prefix string.

Figure 5A:
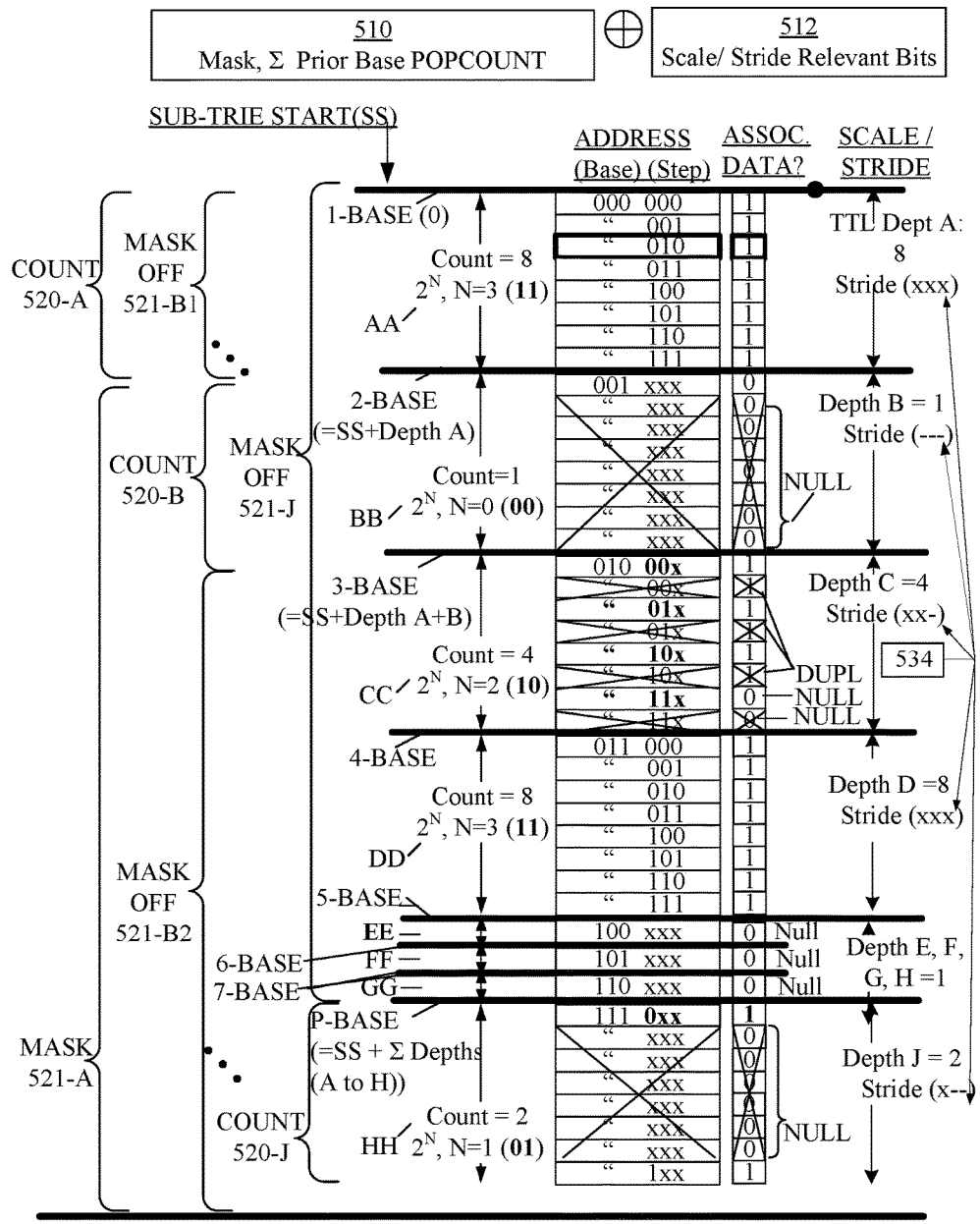
FIG. 5A is an illustration of memory layout with a compressed addressing scheme overlaid on a linear addressing scheme, according to one or more embodiments.

Referring now to FIG. 5A, an illustration is shown of a memory layout 500-A with a compressed addressing scheme overlaid on a linear addressing scheme, according to one or more embodiments. A six-bit prefix string is linearly mapped out for a memory 107 of the packet-forwarding engine 102-1. The prefix string is comprised of two multi-bit strides (MBSs) including the first MBS, or base address being a 3b address from '000' to '111', and the second MBS, or step, also being a 3b address ranging from '000' to '111' for each given first MBS. The associated data column is listed as '1' for valid data (and content), and as '0' for invalid or 'null' data.

To generate a table population vector, a mask blocks addresses outside of a desired range and passes data within the desired range. This is represented by block 510. Thus, for first MBS, or base address, of '000' a mask 521-A blocks off all data outside of base address '000', i.e., addresses 001 xxx through 111 xxx, and counting 520-A the addresses having a common base of '000', namely '000 000' through '000 111'. The result is that all entries have a '1' in the associated data column, resulting in an AA population count=8, which can be encoded as N=3 (or binary 11) for $2^N=8$. Similarly, for second MBS, or base address, of '001', masks 521-B1 and 521-B2 block counting for base addresses outside of base address '001' while counting 520-B the addresses having a common base of '001', namely '001 000' and no others, as their associated data is duplicative (DUPL) of '001 000'. The result is that no entries have a '1' in the associated data column, except the uncompressed base address of '001 xxx', resulting in an BB population count=1, which can be encoded as N=0 (or binary 00) for $2^N=1$. Similarly, for third MBS, or base address, of '010, masks (not shown) block counting for base addresses outside of base address '010' while counting (not shown) the addresses having a common base of '010, namely '010 00x', '010 01x,' '010 10x', and '010 11x' because in this special case, the associated data for every other entry (whether the least significant digit was a 1 or a 0) was duplicative of the other. The exception is for address '010 11x', which was null but still counted because of the binary nature of addressing requiring said pattern of the first two bits of the second MBS. Consequently, checking the last bit made no difference in the resultant associated data—thus, half the entries were duplicative (or null) and could be compressed out. The result is that only half the entries were counted, resulting in a CC population count=4, which can be encoded as N=2 (or binary 10) for $2^N=4$. This process is repeated for all entries, including count DD having a result similar to count AA, and counts EE, FF, GG, and HH (having a result similar to count BB) each having all entries as null and thus keeping only the uncompressed base address of '011 00x', '100 xxx', '101 xxx', and '110 xxx', respectively and thus having a population count=1, which can be encoded as N=0 (or binary 00) for $2^N=1$. Finally, last MBS, or base address, of '111', uses mask 521-J to block counting for base addresses outside of base address '111' while counting 520-J the addresses having a common base of '111', namely '111 0xx' and '111 1xx' and no others, as their associated data is null. The result is that two entries have a '1' in the associated data column, resulting in a HH population count=2, which can be encoded as N=1 (or binary 01) for $2^N=2$.

Regarding depths, the first MBS base address is not compressed. That is, an entry exists for each of the first MBS base address from '000 - - - ' through '111 - - - '. However, the depth of the population of valid addresses having a common first MBS base address must be known. On the right side of the table, a total (TTL) depth of any address having a first MBS of '000' is depth A=00 from a subtrie start (SS) at 1-BASE (0). That is, given a SS address, the first base address of '000 000' starts at the given SS address, with 0 offset. However, for subsequent incremented first MBS base addresses, they have to add the population count(s) for all addresses between them and the SS. Thus, for second MBS base address of '001', the base index 2-BASE must add the depth of A (8, or N=3 (11) for $2^N$) to the SS address. This pattern is repeated through the last entry of first MBS of '111', whose base index P-BASE to the base address '111' adds the depth of A through H to the SS address. The strides 534 for each of the first MBS base addresses are commensurate with the population count therein. For example, count AA of 8 for base address '000' requires the use of all three bits (xxx) of the second MBS step address to locate the respective LPM. Dissimilarly, count BB of 1 for base address '001' requires the use of none of the three bits (---) of the second MBS step address to locate the LPM. This pattern continues through the last of the first MBS step addresses '111' whose count HH of 2 for base address '111 requires the use of one of the three bits (x--) of the second MBS step address to locate the LPM. Thus, the strides can vary from none to all of the bits of the second MBS, depending on the population count for the second MBS. This scaling and striding the relevant bits is shown by block 512.

Referring now to FIG. 5B, a table 500-B is shown illustrating a population count of a 2nd MBS associated with each of multiple 1st MBS addresses, according to one or more embodiments. Table 500-B is the compressed bit vector effective for both FIGS. 5A and 5C. For the $1^{st}$ MBS values shown (000 through 111), the population counts (8 through 2) are represented in a power of 2, provided in binary form (11 through 01), with a reference (X1 through XP) for FIG. 5C. While the present embodiment utilizes an encoding of N for the CBV for $2^N$, which is complemented in FIG. 5C by a 'power of 2' operation to retrieve the count, any embodiment of encoding information in a density that is greater than 1 bit for 1 address can be used. For example, another embodiment can use a straight binary count for the quantity of populated entries for a given first MBS base address (e.g., for AA count, the binary value of '1000' represents 8 entries).

Figure 5C:
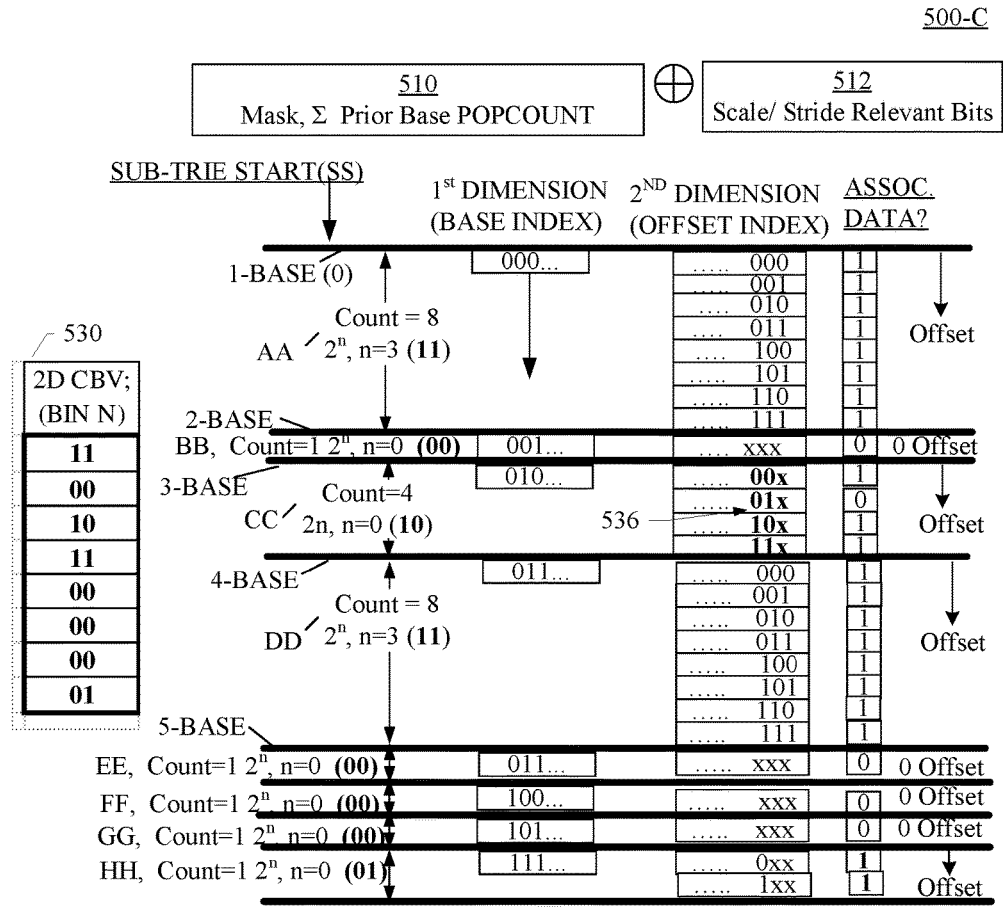
FIG. 5C is an illustration of resultant compressed memory layout alongside its 2D CBV, according to one or more embodiments.

Referring now to FIG. 5C, an illustration is shown of a resultant compressed memory layout 500-C alongside its 2D CBV, according to one or more embodiments. This compressed and space-efficient memory layout is implemented in main memory 144 of coprocessor 140, as shown in FIG. 2. Thus, the original linear memory layout of FIG. 5A implemented in host memory 107 is drastically streamlined for fast operation in coprocessor 140. The first MBS of the prefix string for generating the base index is an index into a first dimension array that is uncompressed. The second MBS of the prefix string for generating the offset index measured from the first MBS location is an index into a second dimension array that is compressed. Thus, the 2D-CBV 530 is a compressed array ($2^N$) of a composite index into a plurality of arrays ($1^{st}$ dimension array and $2^{nd}$ dimension array). Thus, the 2D-CBV is computing 2 individual strides to index into two (interleaved) arrays, where the first MBS picks a given (sub)array and the second MBS indexes to the actual location in that actual array, thus completing the index into the 2D array.

The 2D-CBV is as vector of values, which specify the size of each subarray in the compressed table of arrays. In order index the compressed table, the sum of size of all the preceding arrays must be computed to locate the actual address of the nth array in the LPM array. Thus, the mask and count can be used in general to efficiently accesses a number of arrays of variable sized arrays stored end to end in linear memory. Knowing the size of the nth element in the compression vector specifies how to accesses it.

The same counts from FIG. 5A is shown in FIG. 5C, with first MBS base address '000' having a count of 8, represented in binary by '11' for a $2^N=8$. An offset from the base address is used for an entry of a first MBS base address that has a population greater than 1, e.g., for counts AA, CC and HH. The CBV shown is utilized in subsequent FIG. 6 for generating both a base index to each of the base addresses of the first MBS and an offset index from the base index to reach the applicable LPM.

Figure 6:
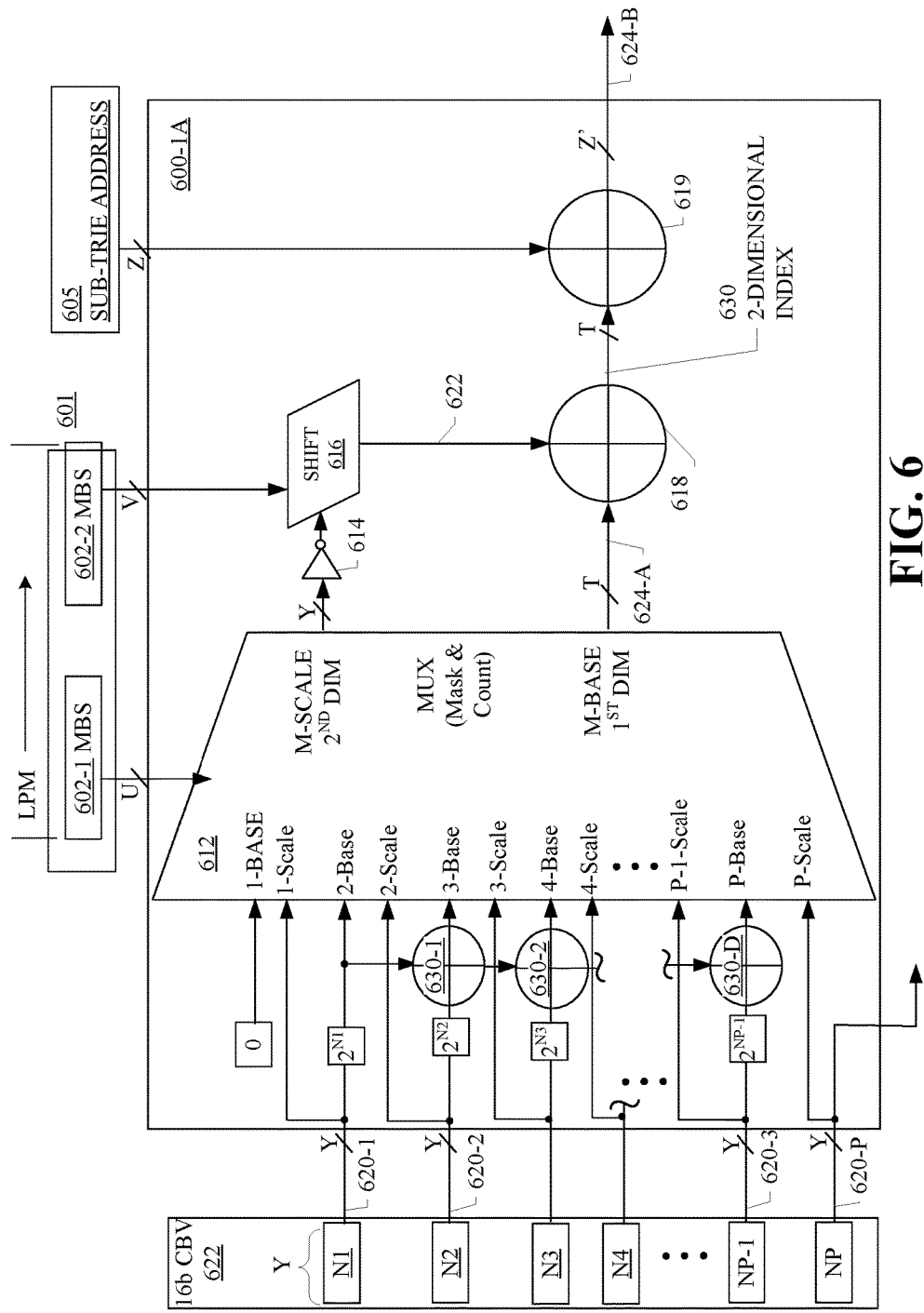
FIG. 6 is a logic schematic of an apparatus for generating a composite index from a base index and an offset index to make a single access into main memory for locating the LPM, according to one or more embodiments.

Referring now to FIG. 6, a logic schematic is shown of an apparatus for generating a composite index from a base index and an offset index to make a single access into main memory for locating the LPM, according to one or more embodiments. First, a given prefix string is stored in memory 601, e.g., a register. The prefix string is divided into a first multi-bit stride (MBS) 602-1 of U bits and a second multi-bit stride 602-2 of V bits. The dividing point for the first and second MBS is a design factor, that can be selectively changed for a given population distribution, e.g., based on statistical and predictive analyses. The first MBS is not compressed, while the second MBS is at least partially to fully compressed (depending on the duplication and null patterns in the actual data, in consideration of the pair of addresses for a given binary digit). There is a trade-off between the larger address space required for a non-compressed address versus a potentially much small address space required for a sparsely populated and compressed address space.

The first and second MBS bit lengths can be dynamically changed on the apparatus in field service, by performing a reboot, and by updating registers that select the bit lengths of the first and second MBS. In this manner, the apparatus can be tuned to changing traffic conditions, or changing statistical distribution of data landscape. This provides real-time modeling for efficiency and throughput.

Mux 612 provides a mask and count function to generate a base index. Mux 612 receives the population vector that is input as CBV 622, a 16b vector (2b wide×8 entries of the first MBS of '000' through '111'), that was generated by a prior mask and count operations shown in FIGS. 5A-5C for population count and address space compression operations. The 2b wide entries N1 through NP, which represent the $2^N$ population of second MBS addresses are stored in any type of memory 622, such as a local RAM. The population counts are communicated to a $2^N$ function block that converts the CBV entry from a value of a power (N=3, or binary 11) to a count value ($8=2^N=2^3$). This is performed prior to any adder 630-$x$ operation, as described in the pseudo code of FIG. 8B. Each of the count values is then provided as an input to the multiplexer (MUX) 612 for the base value (1-base, 2-Base, etc.) of each respective first MBS address (000, 001, through 111) which corresponds to the 1-Base, 2-Base, etc. shown in FIGS. 5A and 5C. The input of 2-Base (for first MBS address of '001') requires only the direct population count of the single prior first MBS address (of '000') as its offset from SS. However, for inputs of 3-Base forward (for first MBS address of '010') the prior population counts (for first MBS address of '000' and '001' are summed as well, per adder 630-1 through 630-D, whose lateral line into mux 612 and downward line to the next adder are the same value. Output 624-A is the base index, having T bits, which is a minimum of only U bits for a condensed memory having address entries only for the first MBS bits, and no address entries for the second MBS bits. Output 624-A can also have a maximum of U+V bits if no compression exists in the compressed address space (rare case of no duplicates and no nulls for the entire address space). This case would rise if the base index of the last entry of the first MBS address (111 000) includes all address entries for the second MBS which is fully populated between that last entry of the first MBS address and the SS. The output 624-A from MUX 612 is determined per a selector input that chooses an input pair of Base/Scale to the MUX 612.

Selector input to mux 612 is provided by first MBS 602-1 stored in memory 601. Specifically, first MBS value 602-1 activates a pair of base and scale inputs provided to the MUX 612 from CBV in local memory 622. Traversing down along the inputs provided to MUX 612 is equivalent to traversing down the memory table of FIG. 5C, with the lower position in the table corresponding to a lower address for first MBS (from 001 to 010 to 011, etc.), each of which requires a higher count of base indexing from a subtrie start (shown as sub-trie address 605 in FIG. 6). The same CBV entry used for the base index is also communicated in parallel in MUX 612 as a scale factor (1-Scale, 2-Scale, etc.), but it is kept as its value power and is not converted to a count value, which will be instrumental in the variable shifter operation discussed later. The scale factor is paired with the respective base value for a given first MBS value (e.g., 2-Base/2-Scale pair, etc.) The starting point is the '0' input for 1-Base for address '000 000' which has no offset from the sub-trie start, as shown in FIG. 5C. In contrast, the 3-Base input from adder 630-1 for first MBS address of '010' is the combination all population counts between it and the sub-trie start, i.e. both the N1 population count (8) of the first MBS ('000') and the prior N2 population count (1) for the prior MBS address ('001'). MUX 612 provides M-Base output 624-A, which is the base index into the first dimension, i.e., the array for the first MBS (which is uncompressed). This base index is added by adder 618 to input 622, which is the offset index. Any means can be used for generating a base index into the main memory based on the first MBS, given the input values of the CBV and the paradigm disclosed herein.

The offset index is determined by a variable shifter, which is any means that can select a variable number of bits of the second MBS portion of the prefix string based on one or more of the plurality of population counts (X1, X2, ... or XP) associated with the second MBS. This is because only a relevant number of bits from the second MBS 602-2 are needed for the offset index. As a first example, illustrated in FIGS. 5A, 5C and 6, if the second MBS address space is fully compressed (e.g., for first MBS base address of '001', all values of second MBS of '000' thru '111' are null) then only the base entry for the uncompressed first MBS address space remains, thereby requiring no offset index from the base entry of the first MBS address. Thus, all bits provided in second MBS 602-2 in register 601 will be shifted out leaving no valid bits to be added to the base index. Shifting all three bits (binary 11) of the three-bit width of second MBS 602-2 in the current example is accomplished using the inverse of the population count of this address space (binary 00). As a second example, if the second MBS address space is fully populated (e.g., for first MBS base address of '011', all values of first MBS of '000' thru '111' are valid and non-duplicative) then a total of 8 entries exist, which thereby requires all the bits of the second MBS address space to be used for an index offset from the base index of first MBS address '011'. In other words, zero shifting is required for this exemplary address space. Shifting zero bits (binary 00) of the three-bit width of second MBS 602-2 in the current example is accomplished using the inverse of the population count of this address space (binary 11, for a full population count of N=11, with $2^N=2^3=8$).

In one embodiment, the variable shifter is comprised of inverter 614 and variable shift register 616 coupled to each other and to a selector (MUX 612) that selects the appropriate x-Scale input. Specifically, when the first MBS 602-1 selects the appropriate pair of Base/Scale inputs, the scale input is communicated as output M-Scale of Y bits to the variable shifter as a depth to proceed in the second dimension per the quantity of bits chosen from the second MBS in 602-2. Thus, it takes both the scale input and the bits from second MBS to create the offset index into the subarray for the second MBS. As an example, if a first MBS 602-1 of '010' is provided as input to MUX 612, then the 3-Base/Scale input will be selected to receive population count CC, which is stored as 3-bit value N3 of CBV in memory 622 equal to '10' as shown in FIGS. 5C and 6. As previously described, when the popcount CC is inverted by inverter to 614 to '01', and applied to shifter 616, then one of the bits for second MBS 602-2 is shifted (to drop the LSB of 'x' as irrelevant) and then communicated to adder 618 to add them to the given base index 624-A. As a further example, if prefix string in 601 is '011 011', then the first MBS address of '010' will generate a base index of 4-Base as shown in FIG. 5C, and the second MBS address of '011' will be shifted zero bits (because the scale is inverted from '11' to '00' resulting in no shift of the second MBS digits) resulting in no change, with the second MBS address of '011' being added by adder 618 to the 4-Base, which is then added by adder 619 to any sub-trie address stored in register 605 to achieve LPM 536, as shown in FIG. 5C.

Variable shifter function can be obtained by any means that inversely discards bits or directly uses bits in second MBS based on a population count of the second MBS. One embodiment can use logic for a modulo operation that has the same effect, albeit at a possibly higher latency and cost.

Figure 7A:
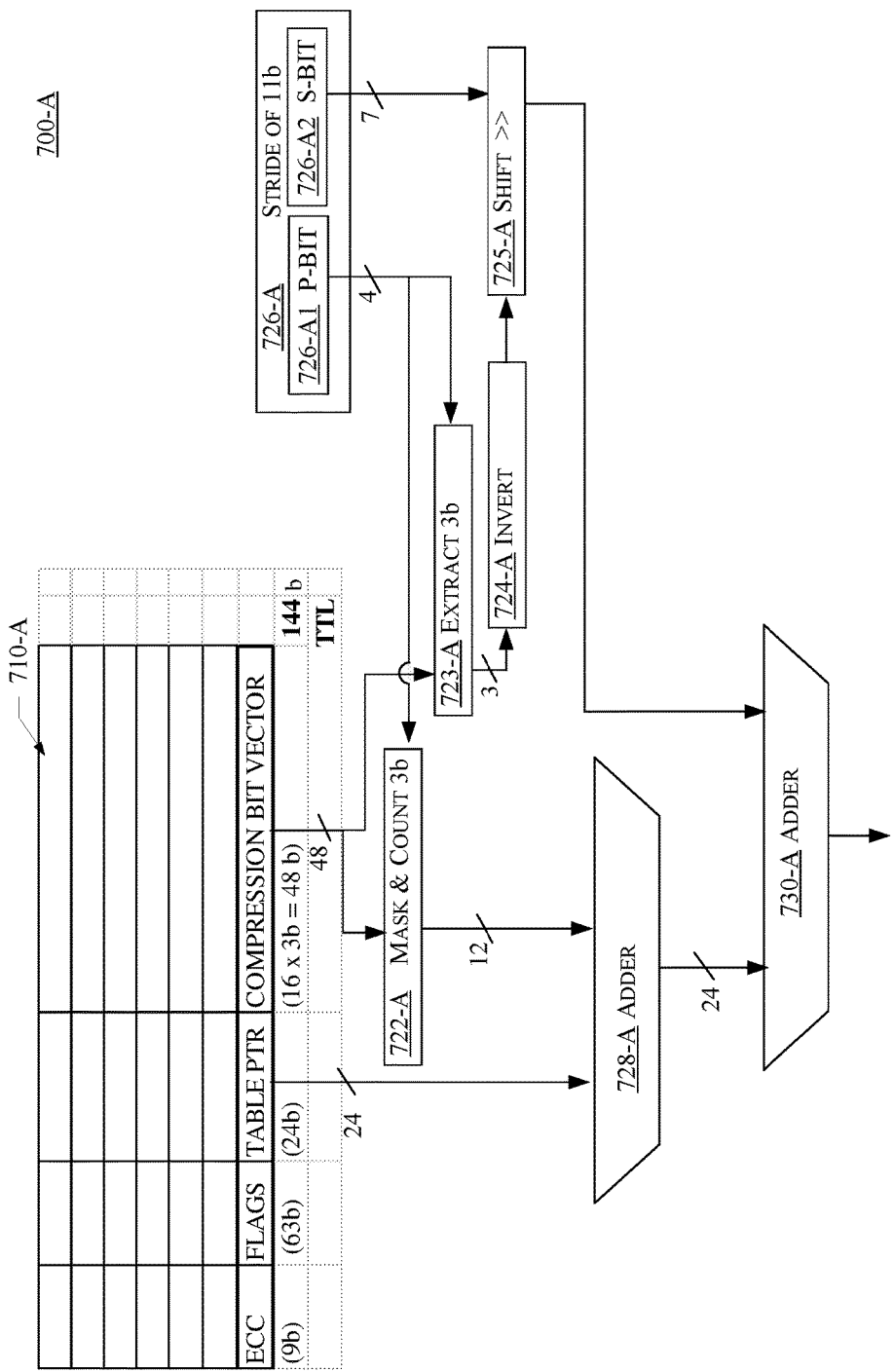
FIG. 7A is a schematic of implementing mask and count with an 11b stride (4b in first MBS+7b in second MBS) of a 144b Mtrie node, according to one or more embodiments.

Referring now to FIG. 7A, a schematic 700-A is shown for implementing mask and count for a prefix string having an 11b stride (4b in first MBS+7b in second MBS) of a 144b Mtrie node, according to one or more embodiments. Table 710-A contains a series of row entries having 9b of error correction code (ECC), 63b of flags, 24b of table pointers (i.e., the sub-trie start), and 48b of compression bit vector (CBV) information. Each row corresponds to a dedicated CBV for a prefix string having first MBS of 726-A1 and second MBS 726-A2 for a given string value prior to the prefix string. Functional schematic blocks in FIGS. 7A, 7B, and 7C (some exceptions) correspond parallelly to schematic blocks of FIG. 6. For example, in FIG. 7A, adders 730-A and 728-A, mask and count block 722-A, extract block 723-A, invert block 724-A and shift block 725-A correspond to their counterparts of adders 619 and 618, mask and count (MUX) 612, extract block (power of 2 block $2^{X1}$ and MUX 612), inverter 614, variable shift register 616. FIG. 7C differs in the use of a modulo subtract block 724-C in lieu of an invert and variable shift register block.

The main difference in schematic 700-A is a different split ratio (unequal and biased to the second MBS) and larger strides for both first MBS 726-A1 and second MBS 726-A2. Because first MBS uses 4b for address space bits, it will consume a larger quantity of uncompressed memory, namely $2^4$, or 16 entries, for just the base address ('0000' through '1111'), as compared to schematic 600-A1 The larger stride of 7b for the second MBS means that a maximum population of addresses (assuming no nulls or duplicates) is $2^7$. To store a power of two that is the value of seven (i.e., N=7 (or binary 111) for $2^N$=128), the width of compressed bit vector (CBV) must be 3, as shown by the '3b' in the Mask and Count block 722-A and in the extract block 723-A. Thus, the CBV is 16 entries for the uncompressed first MBS address times 3 bits for the population count of second MBS 726-A2 address space equals a total vector size of 48b. Likewise, the inverter is a 3-bit inverter to indicate how many digits to shift. For a zero shift example, where all 128 entries for the second MBS address space (i.e., '0000000' through '1111111') are valid (non-null) and non-duplicative for a given first MBS address (e.g., '010'), a population binary count of 111 is stored in the CBV, which when inverted to '000' translates to N=0 and $2^N$=0 for a shift in the second MBS bits. Thus, for every second MBS 7b address, all 7 bits will be added to the base index of the first MBS address in order to locate the LPM of the prefix string. The opposite scenario, a full shift of all bits example, where all 128 entries for the second MBS address space (i.e., '0000000' through '1111111') are invalid (null) or duplicative for a given first MBS address (e.g., '101'), a population binary count of '000' is stored in the CBV, which when inverted to '111' translates to N=0 and $2^N$=1, for the uncompressed first MBS address (i.e., '101 0000000'). The same principles described in FIG. 6 et al, apply equally as well to the present figure.

Figure 7B:
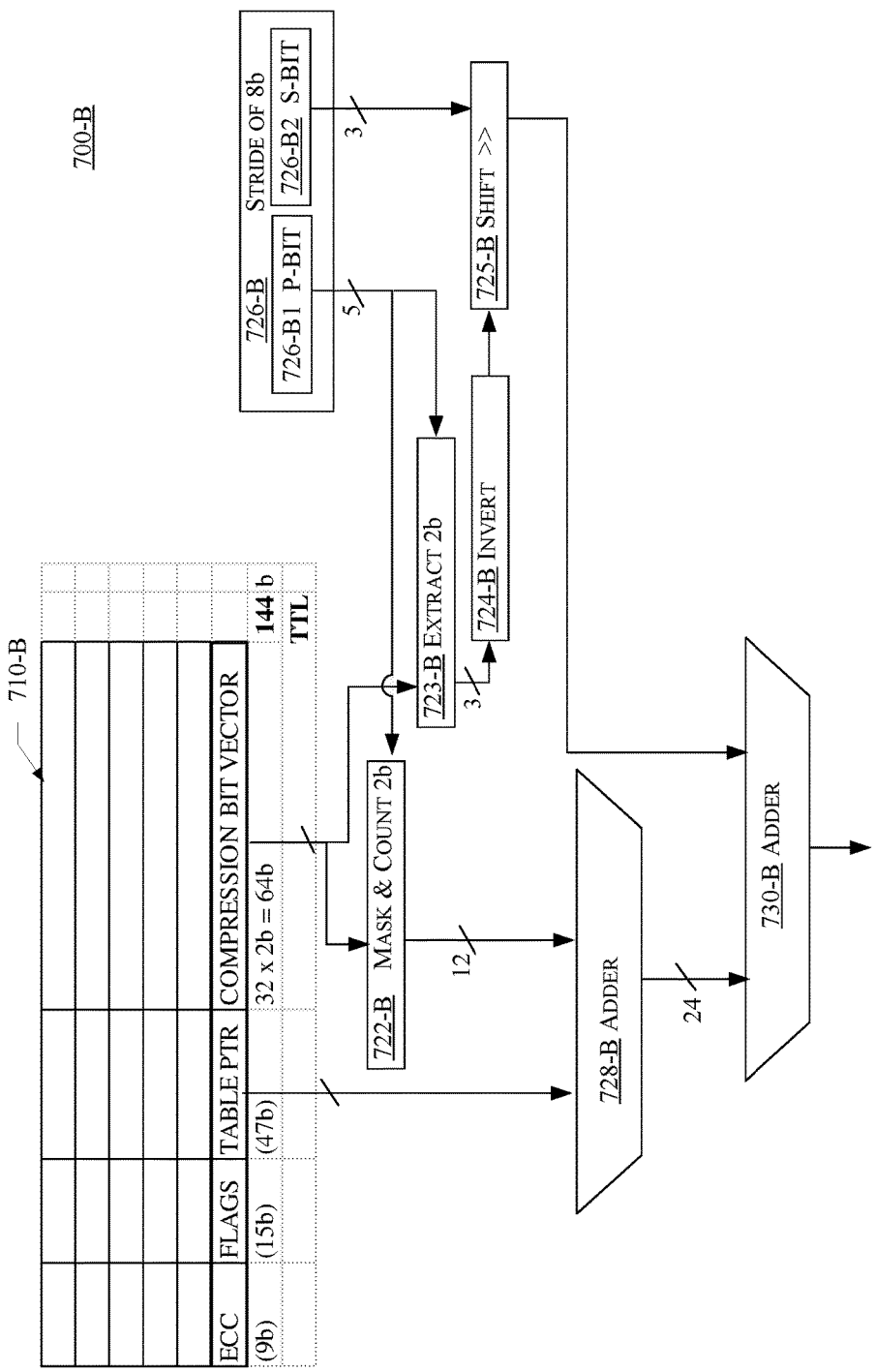
FIG. 7B is a schematic of implementing mask and count with an 8b stride (5b in first MBS+3b in second MBS) of a 144b Mtrie node, according to one or more embodiments.
Figure 7C:
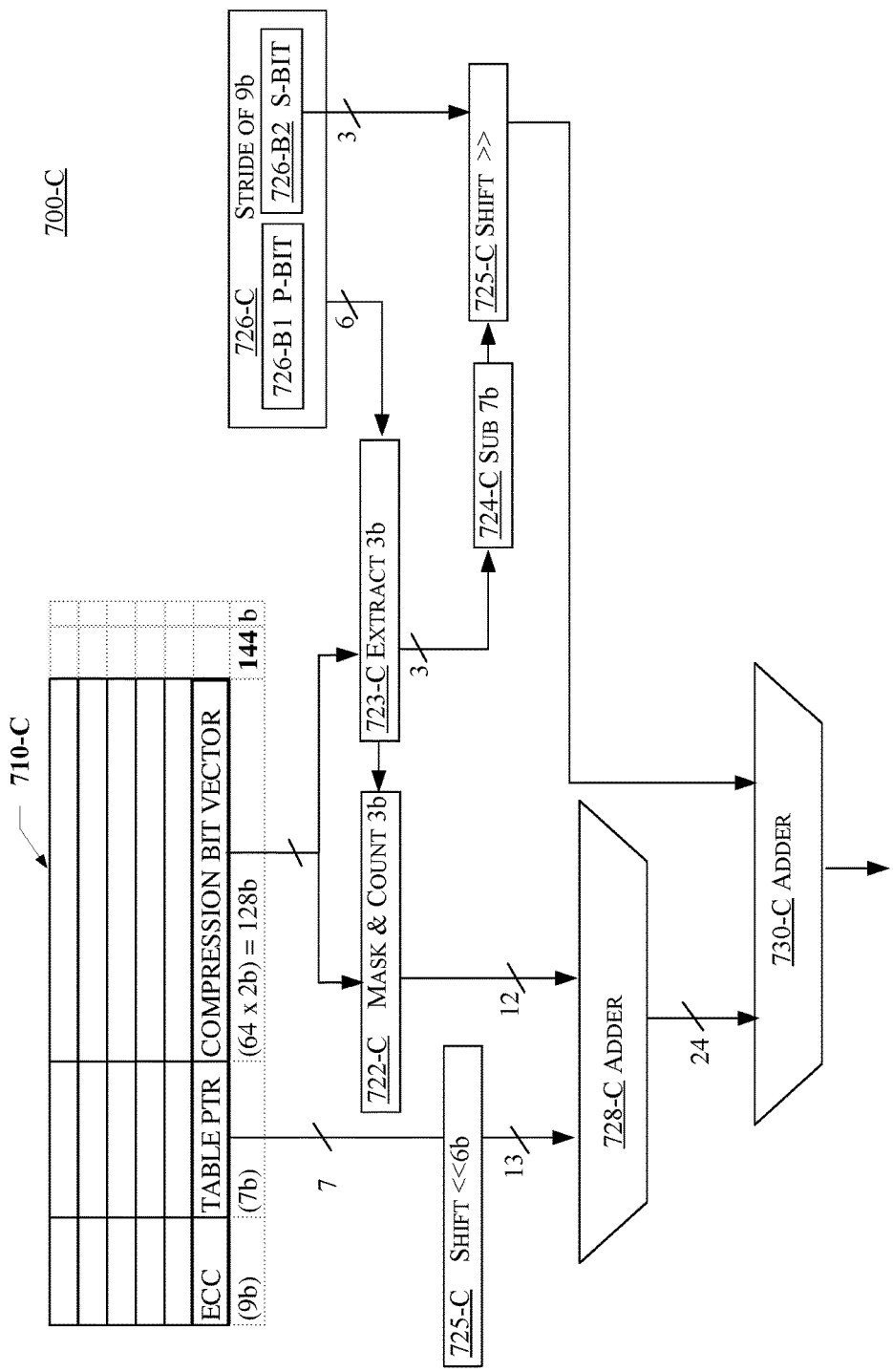
FIG. 7C is a schematic of implementing mask and count with a 9b stride (6b in first MBS+3b in second MBS) of a 144b Mtrie node, according to one or more embodiments.

Referring now to FIG. 7B, a schematic 700-B is shown for implementing mask and count with an 8b stride (5b in first MBS+3b in second MBS) of a 144b Mtrie node, according to one or more embodiments. Similar to FIG. 7A, the present figure provides a reverse ratio that biases a longer bit length for the first MBS address (5b) than that of the second MBS (3b). This ratio might be beneficial for an address population that has little opportunity for compression in the first 5b of the prefix string, and substantial opportunity for compression in the last 3b of the prefix string. Again, a designer can select the variable bit stride for both the first MBS and second MBS.

Referring now to FIG. 7C, a schematic 700-C is shown for implementing mask and count with a 9b stride (6b in first MBS+3b in second MBS) of a 144b Mtrie node, according to one or more embodiments. Similar to FIG. 7B, the present figure provides a reverse ratio that biases a longer bit length for the first MBS address (6b) than that of the second MBS (3b). FIG. 7C uses a functional block of 'subtract 7' for a modulo operation. Thus, for a population count encoded as N=3 (or binary 11) for $2^N$=8 address entries, all the addresses for the second MBS are used to determine an offset index measured from the base index.

Figure 7D:
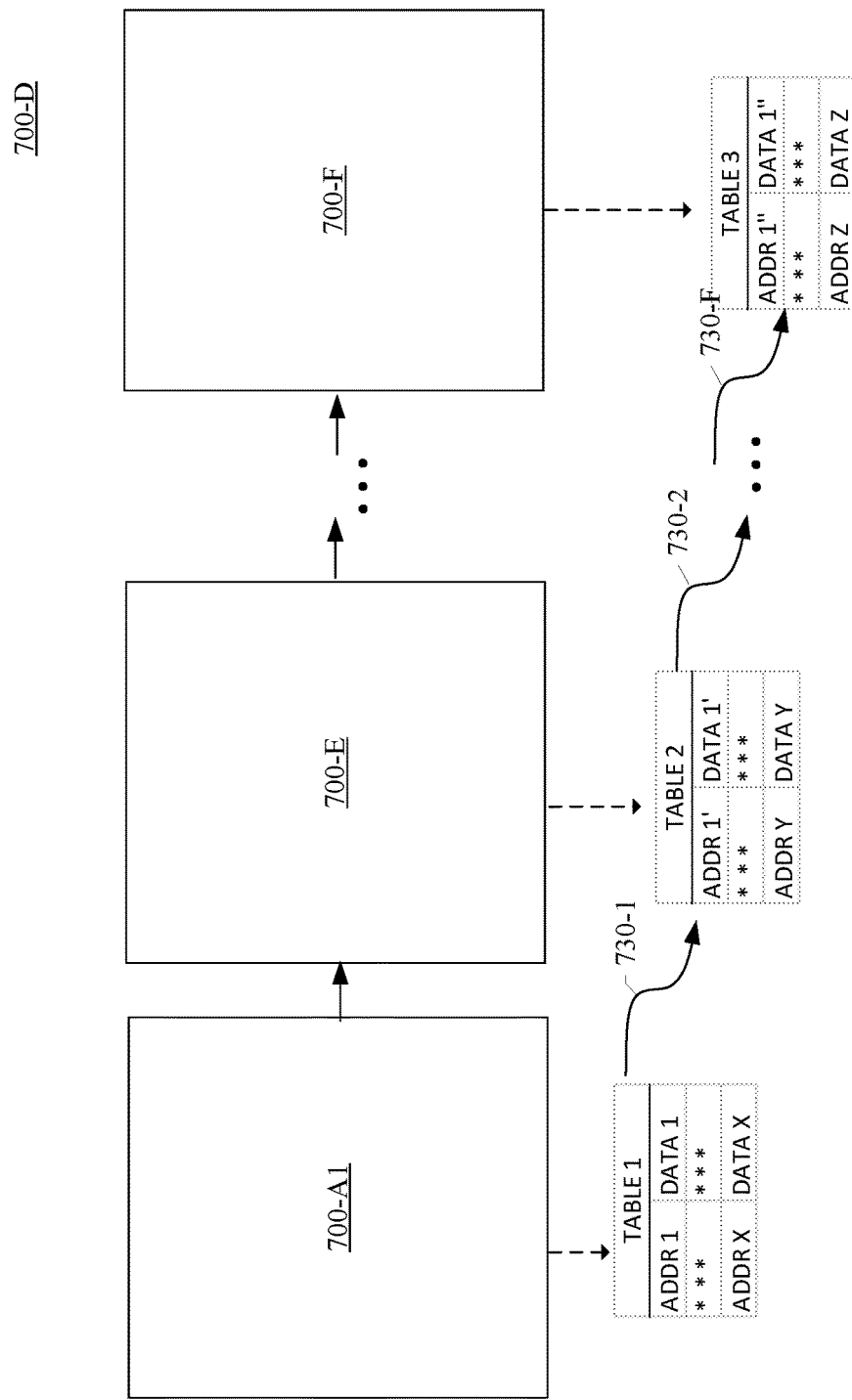
FIG. 7D is a system of multiple index-generating apparatus for LPM operations that are concatenated together for locating a LPM of a compound prefix string, according to one or more embodiments.

Referring now to FIG. 7D, a system of multiple index-generating apparatus for LPM operations concatenated together for locating a LPM of a compound prefix string, according to one or more embodiments. Specifically, a first apparatus for generating a composite index 700-A1 outputs a resultant LPM 730-1 that is a pointer to a second apparatus for generating a composite index 700-E, which outputs another resultant LPM 730-2 that is a another pointer to an optional $F^{th}$ apparatus 700-F for generating a composite index, which outputs a resultant LPM 730-F result. Each of the apparatus has memory with stored data strings (ADDRx) and associated data (DATAx), such as pointers, network addresses, etc. In the present embodiment, two or more of the apparatus can be coupled, up to F quantity, where F is a whole number. Furthermore, different types of apparatus with different prefix string lengths and ratios between a first MBS address length, and a second MBS address length (for each apparatus) can be tailored to match a population landscape (sparse versus concentrated) as it progresses deeper into a compound prefix string. This system provides a fast (with only one access per composite index) and customizable search methodology that works within main memory resource constraints to find a LPM for a lengthy prefix string.

Figure 8A:
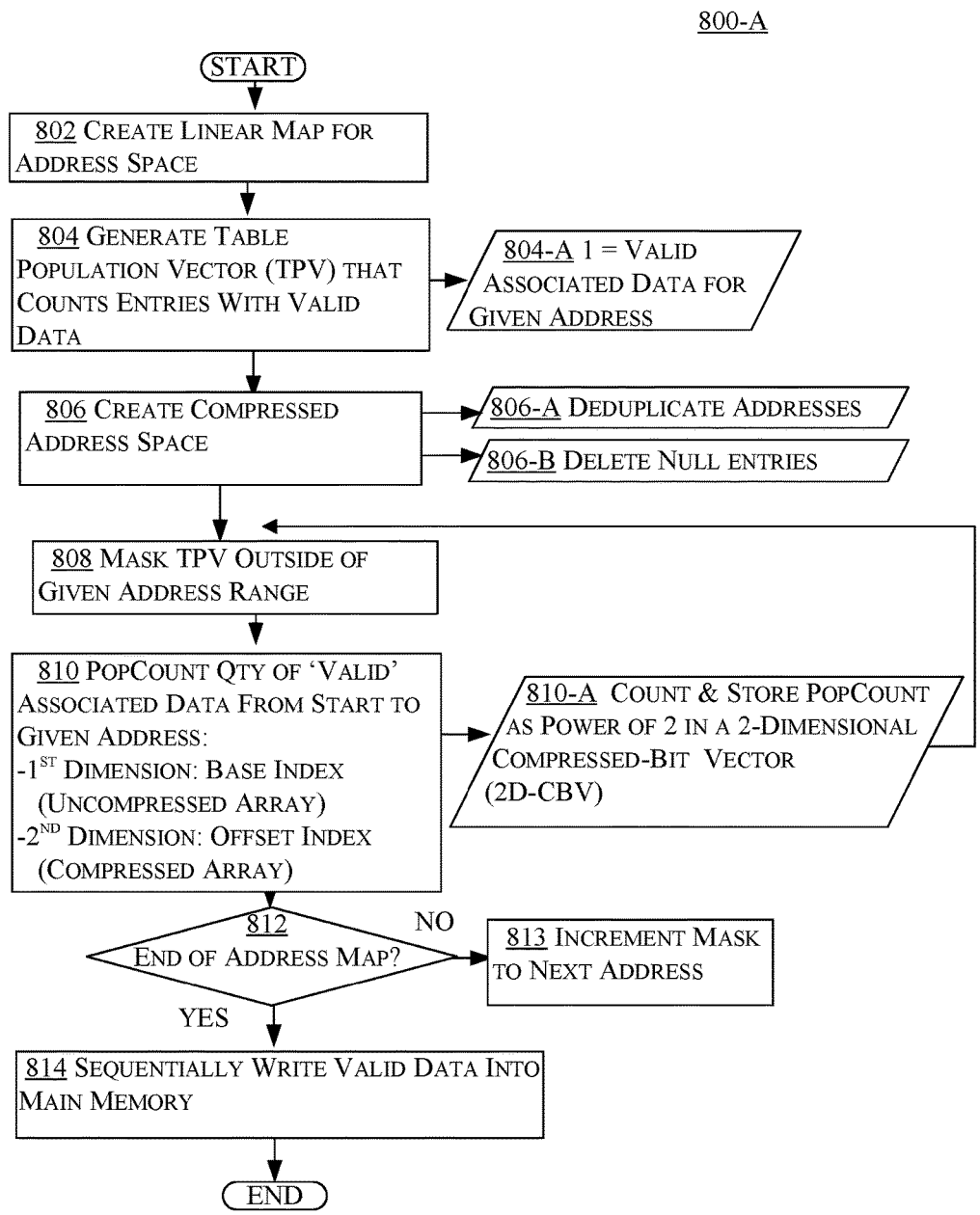
FIG. 8A is a flowchart of a method for compressing an address map in memory and populating a compressed bit vector, according to one or more embodiments.

Referring now to FIG. 8A is a flowchart of a method for compressing an address map in memory, according to one or more embodiments. In operation 802, a linear map for an address space is created (or received) from a network. The address space fleshes out all possible address combinations, or a relevant subset thereof, e.g., relevant geographical areas, countries, classes, categories, or etc. (Scope). An address would be listed even if the associated data was invalid and null data entries for the given Scope. Updated addresses frequently occur, and are included in this process. Typically, the linear address map consumes a substantial amount of space. Consequently, it can be performed on a host, server, NPU, PFE 102-1 shown in FIG. 2, or similar device with the necessary resources. Typically, it would not be performed on dedicated device and/or a device smaller in size and capacity than the host, server, NPU or PFE, e.g., operation 802 would not be performed on a main memory-coprocessor chip 140 of FIG. 2, which is used for traffic management and fast packet throughput. Filling out the address space is comparable to a Karnaugh map that draws out different combinations of variables in a Boolean function.

In operation 804, a table population vector (TPV) is created. Output 804-A of operation 804 is a bit value of '1' which can then be counted in a subsequent operation for a tally or an index. In one embodiment, an uncompressed address space in FIG. 4 is illustrated with a TPV interspersed with logical '1s' and '0s' in table 402 for subsequent counting and organization. For example, the TPV can be used to generate an index into a subsequently compressed address space, as shown by table 404. In addition, a TPV can be used as an indication of a sparsely populated region (having many invalid null, or duplicated data entries) or conversely a region with a concentrated population (valid and additionally non-duplicated entries), for possible decision making opportunities regarding how wide a bit stride should be for a given address range. Operation 806 can be performed before or after creating a compressed address space per operation 806.

In operation 806, the linear address map produced from operation 802 is compressed according to a given protocol. Thus, for example, a protocol could include any one of a number of rules to compress data, such as omitting one or more of null data 804-B, duplicated data 804-A, stale data, etc. The description provided in FIGS. 5A-5C provides one embodiment of procedures and results for compressing data. Notably, this operation can include a rule that does not compress a specific class of data. For example, in the present disclosure, address data associated with a first MBS address space are not compressed, while address data associated with a second MBS address space (concatenated to the first MBS address) is compressed wherever possible to remove duplicated and null data. The result in this latter embodiment is a hybrid address space with uncompressed addresses interleaved with compressed address space. The compressing operation is roughly comparable to simplification of a Karnaugh map to find one of the simplest possible forms for information in the truth table.

In operation 808, a TPV is masked outside a given address range, similar to that shown for uncompressed address space in table 402 of FIG. 4 or in FIG. 5A, with mask 521-$x$ operations. Notably, because of the binary nature of the address, if all entries are validly populated except one, then the entire address space will be mapped because the stride will use all bits in the address to access the valid data, thereby sweeping in the one invalid address space.

In operation 810, a population count operation is performed to count valid and optionally deduplicated addresses. One embodiment utilizes a population count ("PopCount") instruction to count valid data associated with a given address range. A popcount operation can be performed in the linear address space for identifying an index value to a given data in a compressed address location. And a popcount can also be performed on the compressed address space to identify the actual quantity of address entries for a given multi-bit stride (MBS) and to create a two-dimensional compressed bit vector (2D-CBV) output 810-A, as described in FIGS. 5A-5C. This count is typically stored as a '1', but can also be stored in a higher information density, e.g., greater than a one bit to one valid address ratio. For example, the present embodiment stores the population data as a power of 2 in binary form. Section AA has a count of 8, which yields a power of 2 as n=3, for $2^N$. The value of 3 is stored as a binary 11 in the two-bit field of the CBV. The Popcount down to a base address in the first MBS is actually a base index in the first dimension, which is the first MBS array, which is an uncompressed array (even though it includes popcounts of entries in the second MBS disposed between it and the sub-trie SS). The Popcount down from the base address of the first MBS is actually an offset index into the second dimension for the second MBS array, which can be a compressed.

The assembler format implementation for operation 810 is as follows:

psrc? popcnt rdest=rsrc2

The pseudocode implementation for operation 810 is operable on microprocessor or computation engine 560-1 shown in FIG. 4. is as follows:

if (psrc) {
tmp=regfile[rsrc2]
popcnt=0;
for (i=0; i<72; i++) {
popcnt+=(tmp>>i) & 1;
}
regfile[rdest]=popcnt
}

Operation 812 inquires if operation 810 reached the end of the address map. If not, then the mask is incremented to the next address and repeats the mask operation 808, popcount operation 810 and inquiry operation 812. For example, after section AA was counted, the noted operations return to mask and count subsequent sections of memory BB through HH which yields count values of '00', '10', '11', '00', '00', '00', and finally '01', which together form a complete CBV (2b wide×8 entries=16 bit vector) for the entire uncompressed address field of the first MBS (ranging from '000' to '111').

Operation 814 then sequentially writes the valid data and non-duplicated data into main memory, with the exception noted above for binary addressing. FIG. 5C provides one embodiment of a compressed address space that reduces the size of memory required to span a given address width.

Figure 8B:
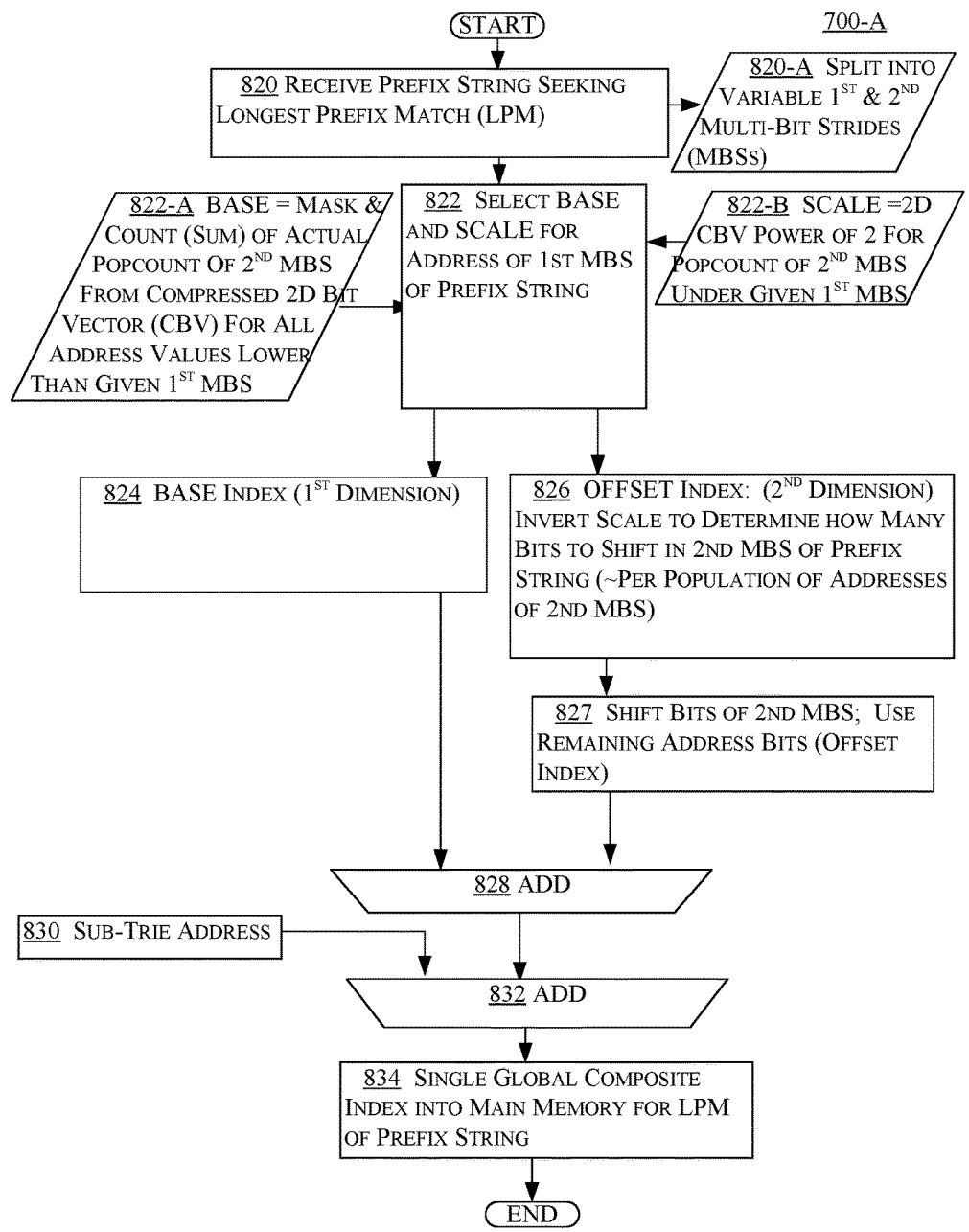
FIG. 8B is a flowchart of a method to generate a composite index for a single access into main memory to locate a LPM by adding a base index for a first MBS of a prefix string and an offset index for a second MBS having a variable-bit length stride, as generated from the compressed bit vector, according to one or more embodiments.

Referring now to FIG. 8B, a flowchart 800-B is shown of a method to generate a composite index for a single access into main memory to locate an LPM. This is accomplished by adding i) a base index for a first MBS of a prefix string to ii) an offset index for a second MBS having a variable-bit length stride, as generated from the compressed bit vector, according to one or more embodiments.

Operation 820 receives a prefix string seeking a longest prefix match (LPM). The prefix string is split, in operation 820-A, into a variable first and second multi-bit strides that are adjacent to each other, i.e., as shown in FIG. 5C. The length of the MBS can be a wide range of combinations, as shown in FIGS. 5C, and 7A-7D. The result is a highly customizable LPM operation that can efficiently use memory resources and limit accesses into memory to provide an optimal latency vs. memory that follows variations in valid population density in a given trie. The split of the prefix string is typically a static setting specified by a data analyst for a given apparatus after analyzing and simulating performance of the LPM operations. However, a dynamically variable MBS setting can be accommodated with In Operation 822-A performs a mask and count (summation) operation on a portion of the 2D compressed bit vector as shown in FIGS. 5C and 6. This is performed on the actual popcount of the second MBS from the compressed bit vector for all address values lower than the given first MBS, i.e., the addresses between the Sub-trie SS and the given base. Because the 2D-CBV is available to all inputs on the MUX 612, the selector will select the appropriate base and scale per the first MBS of the prefix string per operation 822 (e.g., 2-Base and 2-Scale will be chosen for a first MBS value of '001'). Input 822-B inputs a scale of the 2D CBV as a power of 2 for the popcount of the second MBS under a given first MBS as described in FIG. 6.

The assembler format implementation for operations 822 and 822-A is as follows:
Assembler format:
  psrc? mcnt rdest=rsrc1, rsrc2
  psrc? mcnt rdest=rsrc1, imm16
Above, "mcnt" may be any of:
  mcnt2b-2-bit version
  mcnt3b-3-bit version
The pseudocode implementation for operation 606 is operable on microprocessor or computation engine 560-1 shown in FIG. 4. is as follows:

```
if (psrc) {
  op1 = regfile[src1];
  op2 = imm_form ? sign_extend(imm16) : regfile[src2];
  cnt = 0;
  if (mcnt2b) {
    // 2-bit version
    for (i = 0; i < 32; i++) {
      if (op2[i]) {
        cnt = cnt + (1 << op1[1:0]);
      }
      op1 = op1 >> 2;
    }
  } else {
    // 3-bit version
    for (i = 0; i < 16; i++) {
      if (op2[i]) {
        cnt = cnt + (1 << op1[2:0]);
      }
      op1 = op1 >> 3;
    }
  }
  regfile[rdest] = cnt;
}
```

Other features of the present embodiments will be apparent from the accompanying drawings and from the detailed description that follows.

Results from operation 822 are communicated in parallel to parallel to add operation 828 as input 824 for the base index for the first dimension of the array for the first MBS, and with the scale value being processed. In contrast, the scale selected from the 2D CBV is further processed by operation 826, which creates an offset index as the second dimension for scaling the 2D array of both the first MBS and the $2^{nd}$ MBS. As described in FIG. 6, the popcount value obtained from the 2D-CBV is inverted and then passed to operation 8279 to shift the bits of the second MBS by that amount, thereby effectively traversing down in a $2^{nd}$ dimension for the array of the second MBS. Output from 828 is a 2D composite index into the 2D array space (for both the first dimension of the first MBS and the second dimension of the second MBS) of main memory for the LPM of the prefix string. Input 830 provides the sub-trie address to provide a global address location output 834 for the LPM location.

Working with Compressed Trie Nodes
  Population Count Instruction.
  Suppose that pop_vec is an operand register containing a mask, where the value 1 in a bit denotes an occupied entry and 0 denotes an unoccupied entry. The Population Count (popcnt) instruction sums all of the bits in a register. It can be used to calculate the index into a compressed trie node by summing all the population bits from LSB to the index point. A direct approach is to use the next stride value as the length register in an Extract instruction to isolate the relevant bits from a population vector. For example:
    mvpl rlen=6 # Initialize chomp length to 6 bits
    # Get the next stride bits from the key.
    chompd.poshi stride,rpos0=cmd1, cmd0, rpos0, rlen
    extr delta=pop_vec, 0, stride # Use stride to extract relevant population bits.
    popcnt delta=delta # Count up all populated locations
    # Use delta+base address to load word from compressed trie
    mmld64 memr0=base [delta]
  Mask-and-Count Instructions
  When the elements of the trie can be of different sizes (1, 2, 4, 8, 16, 32, 64, 128 or 256), each field of the population vector needs to occupy 2 bits or 3 bits instead of 1 bit. Each field specifies the size of the corresponding element in the compressed trie and the number of bits to be extracted from the key next (1-4 bits or 1-8 bits, respectively). A Mask-and-Count-2-Bit (mcnt2b) or Mask-and-Count-3-Bit (mcnt3b) instruction treats the first source operand as a sequence of 32 2-bit fields or 16 3-bit fields. For each field, it raises 2 to the power of that field (it computes 1<<field) and adds that result to the count. The second source operand is a mask that indicates which fields to include in the count. Using Mask-and-Count allows a user to encode variable strides as well as compress the trie nodes. Table 2 shows the strides associated with the Population-Count and Mask-and-Count instructions.

TABLE 2

Population-vector instructions and their strides

| Instruction | Fixed stride | Variable stride | Total stride |
|---|---|---|---|
| popcnt | 6 bits | 0 bits | 6 bits |
| mcnt2b | 5 bits | 1 to 4 bits | 9 bits |
| mcnt3b | 4 bits | 1 to 8 bits | 12 bits |

Variable-length stride can be used to eliminate lost efficiency due to leaf pushing in the last level of a trie branch. The minimum cost can be kept to 32 W (mcnt2b) or 64 W (mcnt3b) while being able to represent as much as 9-bit to 12-bit branches of a trie. Tries with variable length strides can add complexity. Since most of the storage is in the bottom of the trie structure, you might want to use Mask-and-Count only in the last level of the trie.

The following example implements a variable-length stride of maximum 12 bits:
  mvpl rlen=5 # Initialize chompd length to 6b.
  # Get the next stride bits from the key.

```
chompd.poshi stride,rpos0=cmd1, cmd0, rpos0, rlen
    s2add fstride=stride, stride # Multiply table index stride
    by 3
# Use fixed stride to extract relevant population bits.
extr delta=pop_vec, 0, fstride
mcnt3b delta=delta, 0xffff # Count up all populated loca-
    tions 3 bits at a time.
# Use fixed stride to extract the variable stride (0 to 7).
extr vstride=pop_vec, fstride, 3
add rlen=vstride, 1 # Adjust for 1 bit to 8 bits.
# Get the next stride bits from the key.
chompd.poshi vstride,rpos0=cmd1, cmd0, rpos0, rlen
# Add variable-stride offset to the fixed-stride offset.
add delta=delta, vstride
# Use delta+base address to load word from compressed
    trie.
mmld64 memr0=base [delta]
```

REFERENCES

References to methods, operations, processes, flowcharts, systems, modules, engines, and apparatuses disclosed herein that are implementable in any means for achieving various aspects, including being carried out by a hardware circuit or a plurality of circuits (e.g., CMOS based logic circuitry), firmware, software and/or any combination of hardware, firmware, and/or software, the latter being in a form of a machine-readable medium, e.g., computer readable medium, embodying a set of instructions that, when executed by a machine such as a processor in a computer, server, etc. cause the machine to perform any of the operations or functions disclosed herein. Functions or operations may include storing, communicating, generating, adding, masking, counting, selecting, receiving, shifting, variably shifting, outputting, combining, storing, indexing, and the like.

The term "machine-readable" medium includes any medium that is capable of storing, encoding, and/or carrying a set of instructions for execution by the computer or machine and that causes the computer or machine to perform any one or more of the methodologies of the various embodiments. The "machine-readable medium" shall accordingly be taken to include, but not limited to non-transitory tangible medium, such as solid-state memories, optical and magnetic media, compact disc and any other storage device that can retain or store the instructions and information. The present disclosure is also capable of implementing methods and processes described herein using transitory signals as well, e.g., electrical, optical, and other signals in any format and protocol that convey the instructions, algorithms, etc. to implement the present processes and methods. The memory device or similar electronic computing device manipulates and transforms data represented as physical (electronic) quantities within the devices' registers and memories into other data similarly represented as physical quantities within the devices' memories or registers or other such information storage, transmission, or display devices.

Exemplary computing systems, such as a personal computer, minicomputer, mainframe, server, etc. that are capable of executing instructions to accomplish any of the functions described herein include components such as a processor, e.g., single or multi-processor core, for processing data and instructions, coupled to memory for storing information, data, and instructions, where the memory can be computer usable volatile memory, e.g. random access memory (RAM), and/or computer usable non-volatile memory, e.g. read only memory (ROM), and/or data storage, e.g., a magnetic or optical disk and disk drive). Computing system also includes optional inputs, such as alphanumeric input device including alphanumeric and function keys, or cursor control device for communicating user input information and command selections to processor, an optional display device coupled to bus for displaying information, an optional input/output (I/O) device for coupling system with external entities, such as a modem for enabling wired or wireless communications between system and an external network such as, but not limited to, the Internet. Coupling of components can be accomplished by any method that communicates information, e.g., wired or wireless connections, electrical or optical, address/data bus or lines, etc.

The computing system is only one example of a suitable computing environment and is not intended to suggest any limitation as to the scope of use or functionality of the present technology. Neither should the computing environment be interpreted as having any dependency or requirement relating to any one or combination of components illustrated in the exemplary computing system. The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine-readable medium). Similarly, the modules disclosed herein may be enabled using software programming techniques. For example, the various electrical structure and methods may be embodied using transistors, logic gates, and electrical circuits (e.g., application specific integrated ASIC circuitry and/or in Digital Signal; Processor DSP circuitry).

The present disclosure is applicable to any type of network including the Internet, an intranet, and other networks such as local area network (LAN); home area network (HAN), virtual private network (VPN), campus area network (CAN), metropolitan area network (MAN), wide area network (WAN), backbone network (BN), global area network (GAN), or an interplanetary Internet. Furthermore, the type of medium can be optical, e.g., SONET, or electrical, and the protocol can be Ethernet or another proprietary protocol.

Methods and operations described herein can be in different sequences than the exemplary ones described herein, e.g., in a different order. Thus, one or more additional new operations may be inserted within the existing operations or one or more operations may be abbreviated or eliminated, according to a given application, so long as substantially the same function, way and result is obtained.

As used throughout this application, the word "may" is used in a permissive sense (i.e., meaning having the potential to), rather than the mandatory sense (i.e., meaning must). Similarly, the words "include," "including," and "includes" mean 'including, but not limited to.'

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

The foregoing descriptions of specific embodiments of the present disclosure have been presented for purposes of illustration and description. They are not intended to be exhaustive or to limit the invention to the precise forms disclosed. Many modifications and variations are possible in light of the above teaching without departing from the broader spirit and scope of the various embodiments. The embodiments were chosen and described in order to explain best the principles of the invention and its practical application, thereby to enable others skilled in the art to best utilize the invention and various embodiments with various modifications as are suited to the particular use contemplated. It is intended that the scope of the invention be defined by the Claims appended hereto and their equivalents.

I claim:

1. An apparatus for calculating an index into a main memory, the apparatus comprising:
   an index-generating logic coupleable to the main memory and having a plurality of inputs and an output;
   a local memory for storing a plurality of population counts of compressed data that is stored in the main memory, the local memory selectively coupled to the index-generating logic in order to selectively provide at least a portion of the plurality of population counts to the index-generating logic; and
   a register coupled to provide the index-generating logic a plurality of multi-bit strides (MBSs) of a prefix string; and wherein:
   the index-generating logic generates a composite index on its output to a data location in the main memory; and
   the data location in the main memory is a longest prefix match (LPM) for the prefix string and any data associated with the LPM.

2. The apparatus of claim 1 wherein:
   the plurality of MBSs stored in the register includes at least a first MBS and a second MBS;
   the index-generating logic for generating the composite index comprises:
      a first logic portion that generates a base index into the main memory that is associated with the first MBS;
      a second logic portion that generates an offset index from the base index per the second MBS; and
      a third logic portion coupled to the first and second logic portion and that generates the composite index for a single access into the main memory by adding the offset index to the base index.

3. The apparatus of claim 2 wherein:
   the first logic portion and the second logic portion are parallely coupled to the first MBS and the second MBS, respectively.

4. The apparatus of claim 1 wherein the index-generating logic comprises:
   a mask-and-count logic coupled to a first MBS of the prefix string stored in the register; and wherein:
      the mask-and-count logic masks at least a portion of the plurality of population counts from the local memory not associated with the first MBS; and
      the mask-and-count logic counts another portion of the plurality of population counts from the local memory that are associated with the first MBS to generate a base index (BASE A thru J) into the main memory.

5. The apparatus of claim 1 wherein the index-generating logic comprises:
   a variable shifter coupled to a second MBS of the prefix string stored in the register; and wherein:
      the variable shifter selects a variable number of bits of the second MBS of the prefix string based on one or more of the plurality of population counts associated with the second MBS of the prefix string.

6. The apparatus of claim 1 wherein:
   the local memory stores the plurality of population counts of a second MBS addresses tied to each of a plurality of first MBSs of the prefix string as a compressed multi-bit vector (CBV); and
   the compressed data in the main memory is deduplicated and non-null data.

7. The apparatus of claim 4 wherein:
   the index-generating logic includes a multiplexer; and
   the first MBS of the prefix string stored in the register is a prefix of the prefix string that is separately coupled to the mask-and-count logic.

8. The apparatus of claim 5 wherein the variable shifter further comprises:
   an inverter coupled to the local memory to receive and invert a given population count from the local memory that is associated with a second MBS of the prefix string; and
   a variable shift register that is coupled to the inverter to receive the inverted given population count and that is coupled to the register to receive and variably shift the second MBS of the prefix string by the inverted given population count in order to selectively discard a portion of the second MBS of the prefix string; and wherein:
      the variable shift register performs a quantity of shifts inversely proportional to a quantity of the given population count; and
      the variable shift register outputs an offset index measured from a base index, together which form the composite index into main memory to locate the LPM.

9. The apparatus of claim 1 wherein the index-generating logic comprises:
   one or more adders coupled to the local memory to receive one or more of the plurality of population counts stored in the local memory that are associated with a first MBS of the prefix string; and wherein:
      the one or more adders combine the one or more of the plurality of population counts to provide a base index portion of the composite index.

10. The apparatus of claim 1 further comprising:
    an adder coupled to a mask-and-count logic and to a variable shift register to respectively receive and add: i) a base index associated with the first MBS of the prefix string; and ii) an offset index associated with the second MBS of the prefix string in order to obtain the composite index into main memory.

11. The apparatus of claim 1 wherein:
the index-generating logic generates the composite index for the plurality of multi-bit strides of the prefix string as the composite index for a single access into the main memory to locate the LPM to the prefix string.

12. An apparatus for calculating an index into a main memory, the apparatus comprising:
a means for generating an index into main memory that is coupleable to the main memory and having a plurality of inputs and an output;
a means for storing a plurality of population counts of data stored in the main memory, the local memory selectively coupled to the index-generating logic in order to selectively provide at least a portion of the plurality of population counts to the output; and
a means for storing and for providing the means for generating the index with a plurality of multi-bit strides (MBSs) of a prefix string; and wherein:
the index-generating logic generates a composite index on its output to a data location in the main memory; and
the data location in the main memory is a longest prefix match (LPM) for the prefix string and any data associated with the LPM.

13. The apparatus of claim 12 wherein:
the plurality of MBSs stored in the means for storing includes at least a first MBS and a second MBS;
the means for generating the composite index into main memory comprises:
a means for generating a base index into the main memory that is associated with the first MBS;
a means for generating an offset index from the base index per the second MBS; and
a means for generating the composite index for a single access into the memory by adding the offset index to the base index.

14. A router for locating a LPM in main memory for a given IP address, the router comprising:
a network processor unit (NPU) having a host memory;
a main memory; and
an apparatus for calculating an index into the main memory, wherein the apparatus comprises:
an index-generating logic coupleable to the main memory and having a plurality of inputs and an output;
a local memory for storing a plurality of population counts of data stored in the main memory, the local memory selectively coupled to the index-generating logic in order to selectively provide at least a portion of the plurality of population counts to the output; and
a register coupled to provide the index-generating logic a plurality of multi-bit strides (MBSs) of a prefix string; and wherein:
the index-generating logic generates a composite index on its output to a data location in the main memory; and
the data location in the main memory is a longest prefix match (LPM) for the prefix string and any data associated with the LPM.

15. A method of generating an index into main memory to locate a longest prefix match to a data string, the method comprising:
storing in a local memory a plurality of population counts of compressed data that is stored in the main memory;
selectively providing at least a portion of the plurality of population counts from the local memory to an index-generating logic;
communicating to the index-generating logic, a plurality of multi-bit strides (MBSs) of a prefix string stored in a register;
generating a composite index on an output of the index-generating logic to a data location in the main memory; and wherein:
the data location in the main memory is a longest prefix match (LPM) for the prefix string and any data associated with the LPM.

16. The method of claim 15 further comprising:
generating, via a first logic portion, a base index into the main memory that is associated with a first MBS of the prefix string;
generating, via a second logic portion, an offset index from the base index per a second MBS of the prefix string; and
adding, via a third logic portion, the base index with the offset index to generate the composite index for a single access into the main memory.

17. The method of claim 16 further comprising:
parallely communicating the first MBS and the second MBS to the first logic portion and the second logic portion, respectively.

18. The method of claim 15 further comprising:
masking, via a mask-and-count logic, at least a portion of the plurality of population counts from the local memory not associated with the first MBS; and
counting another portion of the plurality of population counts from the local memory that are associated with the first MBS to generate a base index into the main memory.

19. The method of claim 15 further comprising:
selecting, via a variable shifter, a variable number of bits of the second MBS of the prefix string based on one or more of the plurality of population counts associated with the second MBS of the prefix string.

20. The method of claim 15 further comprising:
receiving in the local memory the plurality of population counts of a second MBS of the prefix string associated with each of a plurality of first MBSs of the prefix string as a compressed multi-bit vector (CBV); and wherein:
the compressed data in the main memory is deduplicated and non-null data.

21. The method of claim 18 further comprising:
selecting, via a multiplexer, one or more of the plurality of population counts based on a first MBS of the prefix string being a selector input to the multiplexer.

22. The method of claim 19 further comprising:
inverting a given population count from the local memory that is associated with a second MBS of the prefix string; and
variably shifting the second MBS of the prefix string by the inverted given population count in order to selectively discard a portion of the second MBS of the prefix string; and
outputting an offset index measured from a base index, together which form the composite index into main memory for the data location in the main memory with the LPM; and wherein:
a quantity of shifts for the variably shifting operation is inversely proportional to a quantity of the population count.

23. The method of claim 15 further comprising:
combining, via one or more adders, the one or more population counts from the local memory associated with a first MBS in order to provide a base index portion of the composite index.

24. The method of claim 15 further comprising:
adding a base index associated with the first MBS of the prefix string to an offset index associated with the second MBS of the prefix string in order to obtain the composite index into main memory.

25. The method of claim 15 further comprising:
outputting the composite index for a single access into the main memory to locate the LPM to the prefix string.

* * * * *